United States Patent
Tanaka et al.

(10) Patent No.: US 8,670,654 B2
(45) Date of Patent: Mar. 11, 2014

(54) IMAGE CAPTURING DEVICE AND IMAGE CAPTURING METHOD

(75) Inventors: Kouji Tanaka, Fujisawa (JP); Takashi Kiyofuji, Yokohama (JP); Norio Kurashige, Machida (JP)

(73) Assignee: JVC Kenwood Corporation, Kanagawa (JP)

( * ) Notice: Subject to any disclaimer, the term of this patent is extended or adjusted under 35 U.S.C. 154(b) by 0 days.

(21) Appl. No.: 13/879,823

(22) PCT Filed: Oct. 13, 2011

(86) PCT No.: PCT/JP2011/073541
§ 371 (c)(1),
(2), (4) Date: Apr. 17, 2013

(87) PCT Pub. No.: WO2012/056896
PCT Pub. Date: May 3, 2012

(65) Prior Publication Data
US 2013/0202266 A1 Aug. 8, 2013

(30) Foreign Application Priority Data

Oct. 29, 2010 (JP) ................................. 2010-243213
Oct. 29, 2010 (JP) ................................. 2010-243214
Feb. 8, 2011 (JP) ................................. 2011-025246

(51) Int. Cl.
*H04N 5/917* (2006.01)
(52) U.S. Cl.
USPC ........................................................ 386/328
(58) Field of Classification Search
USPC ......................................... 386/200, 224, 328
See application file for complete search history.

(56) References Cited

U.S. PATENT DOCUMENTS 6,697,568 B1  2/2004  Kaku
2012/0200730 A1*  8/2012  Kuroiwa .................... 348/222.1

FOREIGN PATENT DOCUMENTS

| JP | 08-017137 | 1/1996 |
| JP | 11-046280 | 2/1999 |
| JP | 2001-036904 | 2/2001 |
| JP | 2002-237984 | 8/2002 |

* cited by examiner

*Primary Examiner* — Huy T Nguyen
(74) *Attorney, Agent, or Firm* — Louis Woo

(57) ABSTRACT

An image capturing device (100) is provided with: an image capturing unit (102) which generates, by continuous image capturing, a plurality of pieces of image data which are continuous in the time direction; an image processing unit which corrects a compression rate of the image data on the basis of a correction factor for correcting the image data, and performs compression coding by use of an intra-frame predictive coding system; a data control unit (124) which stores the image data, which has been subjected to the compression coding, in an image storage unit; a current compression rate derivation unit (130) which derives a current compression rate which is an actual compression rate of the image data which has been subjected to the compression coding; a current compression rate holding unit (132) which holds a plurality of current compression rates continuous in the time direction; a subsequent compression rate prediction unit (134) which predicts a subject compression rate, which is a compression rate of image data to be subjected to the subsequent compression coding next time, from the plurality of current compression rates which are held, or from the plurality of current compression rates which are held and the compression rate of the image data to be subjected to the current compression coding this time; and a correction factor derivation unit which derives the correction factor on the basis of the subsequent compression rate.

21 Claims, 14 Drawing Sheets

(a)

(b)

(c)

IMAGE CAPTURING DEVICE AND IMAGE CAPTURING METHOD

TECHNICAL FIELD

The present invention relates to an image capturing device and an image capturing method designed so that image data generated by continuous image capturing (continuous shooting) is subjected to a compression coding process using intra-frame predictive coding before it is stored.

BACKGROUND ART

An image capturing device (a digital image capturing device) designed to store captured images as digital data (image data) is provided with a function of compressively coding the image data to make a data volume smaller and then storing it, and thereby effectively using a data area in a storage medium. One of such compression coding methods is an intra-frame predictive coding system called JPEG (Joint Photographic Experts Group). This system is mainly used when a still picture is compressed, and there is a system called Motion JPEG in which this is applied to moving pictures. These coding systems are worse than MPEG (Moving Picture Experts Group) or others in compression efficiency at a same bit rate. Since these coding systems do not use information about differences between pictures, they have the advantages that processes at a time of coding and a time of decoding are light, and it is possible to easily edit an arbitrary portion. The present invention premises that an intra-frame coding system such as JPEG is used.

Some image capturing devices have a function of continuously capturing images by continuously pressing a release switch. In such continuous image capturing, a lot of image data is generated at one time, and thus a compression coding process needs to be properly controlled so that the data volume of the generated image data will be within a desired data volume. In the prior art, the following process is performed. Actions such as provisionally subjecting a plurality of pieces of image data (raw data) which occur after image capturing to a compression coding process with using a predetermined parameter about compression, and changing the parameter in response to a result thereof and implementing the compression coding process again are iterated so that all the data volumes of pieces of continuously captured image data will be closer to a desired data volume (for example, patent document 1).

There is also a known technique designed so that a compression coding process on an image signal is performed in response to each of the maximum value and the minimum value for an initial value in a search range for a compression rate, and a correlation between the compression rate and the data volume occurring after the compression coding process is calculated on the basis of the data volume obtained by the compression coding process with the maximum value and the data volume obtained by the compression coding process with the minimum value, and a candidate of the compression rate providing a desired data volume occurring after the compression coding process is estimated (for example, patent document 2).

In addition, there is a disclosed technique designed so that to implement a compression coding process in a short time, taking out image data and calculating a compression rate are continuously performed, and the next-time compression coding process on the image data is performed according to the compression rate calculated immediately before an image capturing operation is done (for example, patent document 3).

Likewise, there is a disclosed technique where a desired value and the data volume of one piece of image data occurring after a compression coding process are compared, and a next-time compression rate is decided so that the data volume will be approximately equal to the desired value (for example, patent document 4).

PRIOR ART DOCUMENTS

Patent Documents

Patent document 1: Japanese patent application publication number 2008-141591
Patent document 2: Japanese patent application publication number Hei 10-150633
Patent document 3: Japanese patent application publication number Hei 11-122573
Patent document 4: Japanese patent application publication number 2000-125255

SUMMARY OF THE INVENTION

Problem to be Solved by the Invention

As mentioned above, in order to store many pieces of image data generated by continuous image capturing in a storage medium having a limited data capacity, it is necessary to subject the image data generated by image capturing to a compression coding process. In order to hold may pieces of image data generated by continuous image capturing within a desired data volume, it is also necessary to properly control a compression rate in the compression coding process. In an image capturing device, a compression coding process is performed according to, for example, a preset target compression rate. However, regarding some image data, there occurs a case where an actual compression rate greatly deviates from a target compression rate.

In order to hold it within a desired data volume, it is necessary to correct such a compression rate deviation. For example, in the techniques of patent document 1 and patent document 2, in addition to a provisional compression coding process, a compression coding process based on a result thereof is repetitively performed, and hence there occurs a problem such that a long time needs to be taken until a final compression rate is decided. In the techniques of patent document 3 and patent document 4, a compression rate for image data is predicted on the basis of only a compression rate for immediately preceding image data, and hence there occurs the problem that a prediction accuracy of a compression rate is low in the case where irregular images are captured or a movement amount between images is great.

In view of such problems, the present invention has an object to provide an image capturing device and an image capturing method which can perform a compression coding process at a high accuracy and a high speed when continuous image capturing is done.

Means for Solving the Problem

In order to solve the above-mentioned problems, the present invention provides an image capturing device and an image capturing method mentioned below.

(1) An image capturing device characterized by comprising an image capturing unit generating a plurality of pieces of image data which are continuous in the time direction by continuous image capturing; an image processing unit correcting a compression rate of the image data on the basis of a correction factor for correcting the image data, and performing compression coding by use of an intra-frame predictive coding system; a data control unit storing the image data, which has been subjected to the compression coding by the image processing unit, in an image storage unit; a current compression rate derivation unit deriving a current compression rate which is an actual compression rate of the image data which has been subjected to the compression coding by the image processing unit; a current compression rate holding unit holding a plurality of current compression rates derived by the current compression rate derivation unit and being continuous in the time direction; a subsequent compression rate prediction unit predicting a subject compression rate, which is a compression rate of image data to be subjected to the compression coding next time, on the basis of the plurality of current compression rates held by the current compression rate holding unit, or on the basis of the plurality of current compression rates held and the compression rate of the image data to be subjected to the compression coding this time; and a correction factor derivation unit deriving the correction factor on the basis of the subsequent compression rate predicted by the subsequent compression rate prediction unit.

(2) The image capturing device mentioned in the above (1), characterized in that the subsequent compression rate prediction unit averages a predetermined number of the current compression rates and labels the average value as the subsequent compression rate.

(3) The image capturing device mentioned in the above (1), characterized in that the subsequent compression rate prediction unit averages difference values between a predetermined number of the current compression rates neighboring in the time direction of the current compression rates, and adds the average value to the latest current compression rate to get the subsequent compression rate.

(4) The image capturing device mentioned in the above (1), characterized in that the subsequent compression rate prediction unit averages variation rates of a predetermined number of the current compression rates neighboring in the time direction of the current compression rates, and multiplies the latest current compression rate by the average value to get the subsequent compression rate.

(5) The image capturing device mentioned in the above (1), characterized in that the subsequent compression rate prediction unit changes 2 or 3 processes in response to a variation situation of the current compression rates and thereby predicts the subsequent compression rate, the 2 or 3 processes being selected from a group of a process averaging a predetermined number of the current compression rates, a process adding an average value of difference values between the current compression rates neighboring in the time direction of the current compression rates, and a process multiplying the latest current compression rate by an average value of variation rates of the current compression rates neighboring in the time direction of the current compression rates.

(6) The image capturing device mentioned in any one of the above from (1) to (5), characterized in that the image processing unit is a frequency response processing unit converting a frequency-domain characteristic of the image data on the basis of a frequency response characteristic being the correction factor, and the correction factor derivation unit is a frequency response derivation unit deriving the frequency response characteristic on the basis of the subsequent compression rate and a target compression rate.

(7) The image capturing device mentioned in the above (6), characterized in that there is further provided a frequency response table making a plurality of the predetermined frequency response characteristics, difference values between the subsequent compression rates and the target compression rate, and the plural frequency response characteristics in correspondence, and the frequency response derivation unit selects one frequency response characteristic by using the frequency response table.

(8) The image capturing device mentioned in any one of the above from (1) to (5), characterized in that the image processing unit is a gradation processing unit converting a gradation of the image data on the basis of a gradation characteristic being the correction factor, and the correction factor derivation unit is a gradation derivation unit deriving the gradation characteristic on the basis of the subsequent compression rate and a target compression rate.

(9) The image capturing device mentioned in the above (8), characterized in that there is further provided a gradation table making a plurality of the predetermined gradation characteristics, difference values between the subsequent compression rates and the target compression rate, and the plural gradation characteristics in correspondence, and the gradation derivation unit selects one gradation characteristic by using the gradation table.

(10) The image capturing device mentioned in any one of the above from (1) to (5), characterized in that the image processing unit is a compression processing unit subjecting the image data to a compression coding process on the basis of a quantization table being the correction factor, and the correction factor derivation unit is a quantization table derivation unit deriving the quantization table on the basis of the subsequent compression rate and a target compression rate.

(11) The image capturing device mentioned in the above (11), characterized in that there is further provided a quantization correspondence table making a plurality of predetermined quantization tables, difference values between the subsequent compression rates and the target compression rate, and the plural quantization tables in correspondence, and the quantization table derivation unit selects one quantization table by using the quantization correspondence table.

(12) The image capturing device mentioned in the above (1), characterized in that there is further provided a generation speed managing unit which makes the speed of generation of the image data by the image capturing unit higher than an image capturing storing speed being a speed at which the image data is stored in response to an arbitrary trigger, and which changes it to the image capturing storing speed at a prescribed timing after the arbitrary trigger.

(13) The image capturing device mentioned in the above (12), characterized in that the generation speed managing unit makes the speed of generation of the image data by the image capturing unit lower than the image capturing storing speed until the arbitrary trigger occurs and after the image data which is compression-coded last is stored in the image storage unit.

(14) The image capturing device mentioned in the above (12) or (13), characterized in that the arbitrary trigger is a preparation process for storing the image data.

(15) The image capturing device mentioned in the above (1), characterized in that the image capturing unit comprises a plurality of image capturing units, and each generates a plurality of pieces of image data which are continuous in the time direction by continuous image capturing; the image processing unit comprises a plurality of image processing units, and corrects compression rates of a plurality of pieces of the image data generated by the plurality of image capturing units and performs compression coding by using an intra-frame predictive coding system; the current compression rate derivation unit derives a current compression rate which is an actual compression rate of the image data which has been subjected to the compression coding by one image processing unit among the plurality of image processing units; the correction factor derivation unit derives the correction factor on the basis of the subsequent compression rate predicted by the subsequent compression rate prediction unit, and updates the plurality of image processing units; the data control unit stores the image data, which has been subjected to the compression coding by an image processing unit different from said one image processing unit, in the image storage unit; and the image data by an image capturing unit relating to said one image processing unit is generated at a first generation speed higher than the speed of generation of the image data by the image processing unit different from said one image processing unit.

(16) The image capturing device mentioned in the above (15), characterized in that the current compression rate derivation unit, the current compression rate holding unit, the subsequent compression rate prediction unit, and the correction factor derivation unit start processes in response to an arbitrary trigger.

(17) The image capturing device mentioned in the above (16), characterized in that there is further provided a generation speed managing unit which causes the image data by the image capturing unit relating to said one image processing unit to be generated at a second generation speed lower than the first generation speed or which prevents the image data from being generated during a term from the moment at which the data control unit starts storing the compression-coded image data in the image storage unit to the moment of the occurrence of the arbitrary trigger.

(18) The image capturing device mentioned in the above (17), characterized in that each time the data control unit stores the compression-coded image data in the image storage unit, the generation speed managing unit causes the image data by the image capturing unit relating to said one image processing unit to be generated at the first generation speed during a prescribed term until the storing is done.

(19) The image capturing device mentioned in any one of the above from (16) to (18), characterized in that the arbitrary trigger is a preparation process for storing the image data.

(20) The image capturing device mentioned in any one of the above from (1) to (19), characterized in that the data control unit stores, among a plurality of pieces of the compression-coded image data, only one piece of the image data which has been compression-coded last in the image storage unit.

(21) An image capturing method characterized by comprising: an image capturing step generating a plurality of pieces of image data which are continuous in the time direction by continuous image capturing; an image processing step correcting a compression rate of the image data generated in the image capturing step on the basis of a correction factor for correcting the image data, and performing compression coding by use of an intra-frame predictive coding system; a data control step storing the image data, which has been subjected to the compression coding by the image processing step, in an image storage unit; a current compression rate derivation step deriving a current compression rate which is an actual compression rate of the image data which has been subjected to the compression coding by the image processing step; a current compression rate holding step holding a plurality of current compression rates derived by the current compression rate derivation step and being continuous in the time direction; a subsequent compression rate prediction step predicting a subsequent compression rate, which is a compression rate of image data to be subjected to the compression coding next time, on the basis of the plurality of current compression rates held by the current compression rate holding step, or on the basis of the plurality of current compression rates held and the compression rate of the image data to be subjected to the compression coding this time; and a correction factor derivation step deriving the correction factor on the basis of the subsequent compression rate predicted by the subsequent compression rate prediction step.

Advantage of the Invention

As explained above, according to the present invention, it is possible to perform a compression coding process at a high accuracy and a high speed when continuous image capturing is done.

MODES FOR CARRYING OUT THE INVENTION

Figure 1:
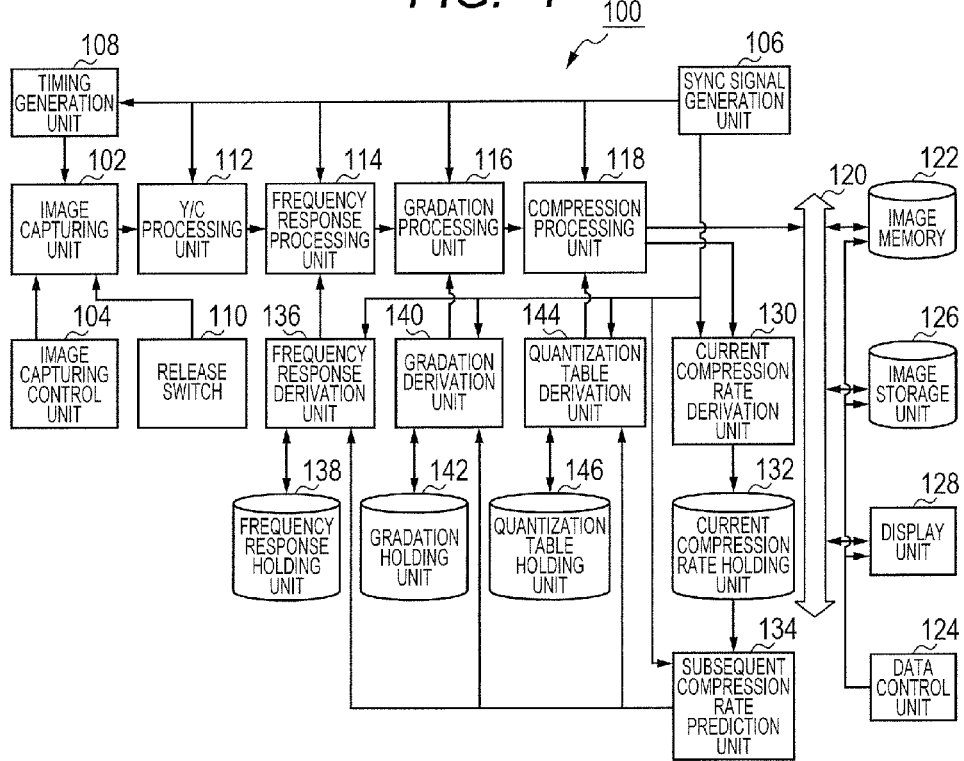
[FIG. 1] It is a function block view showing a diagrammatic structure of an image capturing device relating to a first embodiment.

Preferred embodiments of the present invention will be explained in detail below with reference to accompanying drawings. Sizes, materials, and other specific numerical values indicated in these embodiments are merely examples shown for making an understanding of the present invention easier, and do not limit the present invention except where otherwise noted. In the present specification and drawings, elements having substantially the same function and structure are denoted by same reference characters, and thereby duplicate explanations will be omitted and illustration of elements which are not directly related to the present invention will be omitted from the drawings.

In the present embodiments, "image data" means data generated by image capturing done once by an image capturing sensor in an image capturing unit and corresponding in quantity to one frame. In addition, "image capturing" means an action of generating image data through the image capturing unit, and "storing" means an action of storing the generated image data in a storage medium.

Furthermore, "continuous image capturing" means a sequence of actions of generating image data successively and continuously in the time direction. As a result, for example, one or more pieces of image data are generated per second. In the present embodiments, a speed occurring in the case where continuous image capturing is done and generated image data is continuously stored is referred to as an image capturing storing speed, and the image capturing storing speed takes a value of one piece/sec or more, for example, 60 pieces/sec. Furthermore, "single shooting" means an action of generating at least one piece of image data, and in some cases, it contains up to an action of storing the one piece of image data, and it is not exclusive of the fact that an action of generating image data is carried out plural times before the image data is stored.

(First Embodiment: Image Capturing Device 100)

FIG. 1 is a function block view showing a diagrammatic structure of an image capturing device 100 relating to a first embodiment. The image capturing device 100 is formed by containing an image capturing unit 102, an image capturing control unit 104, a sync signal generation unit (SSG: Synchronizing Signal Generator) 106, a timing generation unit (TG: Timing Generator) 108, a release switch 110, a Y/C processing unit 112, a frequency response processing unit 114, a gradation processing unit 116, a compression processing unit 118, a system internal bus 120, an image memory 122, a data control unit 124, an image storage unit 126, a display unit 128, a current compression rate derivation unit 130, a current compression rate holding unit 132, a subsequent compression rate prediction unit 134, a frequency response derivation unit 136, a frequency response holding unit 138, a gradation derivation unit 140, a gradation holding unit 142, a quantization table derivation unit 144, and a quantization table holding unit 146.

The frequency response processing unit 114, the gradation processing unit 116, and the compression processing unit 118 function as an image processing unit which corrects a compression rate for image data generated by the image capturing unit 102 on the basis of a correction factor or factors and implements compression coding by using an intra-frame predictive coding system. The frequency response derivation unit 136, the gradation derivation unit 140, and the quantization table derivation unit 144 function as a correction factor derivation unit which derives a correction factor or factors. Here, the correction factor or factors mean one or plural factors selected from a group of a frequency response characteristic, a gradation characteristic, and a quantization table. The frequency response characteristic, the gradation characteristic, and the quantization table will be explained in detail later.

The data control unit 124, the current compression rate derivation unit 130, the subsequent compression rate prediction unit 134, the frequency response derivation unit 136, the gradation derivation unit 140, and the quantization table derivation unit 144 may be formed by hardware or may be implemented by software through a central processing unit (CPU) which operates while cooperating with a ROM in which, for example, a program is stored, a RAM serving as a work area, and others. While the gradation processing unit 116 is connected with the rear stage of the frequency response processing unit 114 in FIG. 1, the order may be reversed.

The image capturing unit 102 is formed by a lens, an image capturing sensor subjecting incident light incoming through the lens to photoelectric conversion and thereby generating image data, and others, and generates, for example, a plurality of pieces of image data which are continuous in the time direction by continuous image capturing and sequentially sends the plurality of the generated pieces of image data to the Y/C processing unit 112. The image capturing control unit 104 controls a drive portion of the image capturing unit 102 so that a zoom magnification, an aperture stop, and a focal point of the image capturing unit 102 will be equal. The sync signal generation unit 106 generates a horizontal sync signal and a vertical sync signal in correspondence with the horizontal size and the vertical size of generated image data and in synchronism with an internal clock, and sends them to the timing generation unit 108.

The timing generation unit 108 generates a control signal for varying a clock timing for the image capturing sensor of the image capturing unit 102 on the basis of the horizontal sync signal and the vertical sync signal generated by the sync signal generation unit 106. The image capturing unit 102 generates image data in response to this control signal. The release switch 110 is formed by, for example, a button switch, and accepts an operation input by an image capturing person and generates a control signal being a trigger (an occasion) for the image data generation in the image capturing unit 102. In the image capturing device 100 of the present embodiment, the image capturing person can make continuous image capturing by continuously pressing the release switch 110.

The Y/C processing unit 112 performs a process of converting and separating the image data into luminance data (Y) and color data (C). The frequency response processing unit 114 converts the frequency-domain characteristic of the image data past through the Y/C processing unit 112 on the basis of a frequency response characteristic derived by the frequency response derivation unit 136 which will be mentioned later. The gradation processing unit 116 converts the gradation of the image data, which has been subjected to the process of converting the frequency response characteristic, on the basis of a gradation characteristic derived by the gradation derivation unit 140 which will be mentioned later.

The compression processing unit 118 subjects the image data, which has been subjected to the process of converting the gradation characteristic, to a compression coding process on the basis of a quantization table according to a JPEG compression system, and sends the image data, which has been subjected to the compression coding process, to the image memory 122 via the system internal bus 120. Since the JPEG compression system is an already-existing technique, a detailed explanation thereof will be omitted here. The compression processing unit 118 may use various already-existing still-picture compression systems other than the JPEG compression system.

The image memory 122 is formed by a buffer such as an SRAM or a DRAM, and temporarily holds the image data sent from the compression processing unit 118. The data control unit 124 transfers the image data, which is temporarily held in the image memory 122, to the image storage unit 126 via the system internal bus 120 and makes the image data held, and makes an image, which is based on the image data held in the image memory 122, indicated on the display unit 128.

The image storage unit 126 is formed by a storage medium such as a flash memory or an HDD which is formed integrally with the image capturing device 100, and holds one or more pieces of image data. An external storage medium which can be attached to and removed from the image capturing device 100 such as an optical disc medium such as a DVD or a BD (Blu-ray Disc), a magnetic medium such as a magnetic tape or a magnetic disc, a flash memory, a portable HDD, and others may be used as the image storage unit 126. Correctly, the HDD is a device, and for convenience of explanation, it is handled as having the same meaning as the other storage medium in the present embodiment. The display unit 128 is formed by, for example, a liquid crystal display or an organic EL (Electro Luminescence) display.

The current compression rate derivation unit 130 compares the data volume of the image data which occurs before being subjected to the compression coding process by the compression processing unit 118 and the data volume of the image data which occurs after being subjected to the compression coding process, and thereby derives a current compression rate being the latest and actual compression rate in the compression coding process. In addition, it makes the derived current compression rates sequentially held in the current compression rate holding unit 132. The current compression rate holding unit 132 holds a plurality of the current compression rates which are derived by the current compression rate derivation unit 130 and which are continuous in the time direction. Thus, the current compression rates occurring in the past plural times are held in the current compression rate holding unit 132.

The subsequent compression rate prediction unit 134 fetches, from the current compression rate holding unit 132, the current compression rates inclusive of the latest compression rate which correspond to a plurality of past times, and predicts a subsequent compression rate being a compression rate for the image data to be subjected to the compression coding process next time from the plurality of the current compression rates, or a plurality of the held compression rates and the compression rate for the image data to be subjected to the compression coding process this time.

The frequency response derivation unit 136 derives a frequency response characteristic used by the frequency response processing unit 114 on the basis of the last frequency response characteristic held in the frequency response holding unit 138, the subsequent compression rate predicted by the subsequent compression rate prediction unit 134, and a preset target compression rate for continuous image capturing so that the predicted subsequent compression rate will be closer to the target compression rate.

The gradation derivation unit 140 derives a gradation characteristic used by the gradation processing unit 116 on the basis of the last gradation characteristic held in the gradation holding unit 142, the subsequent compression rate predicted by the subsequent compression rate prediction unit 134, and the preset target compression rate for continuous image capturing so that the predicted subsequent compression rate will be closer to the target compression rate.

The quantization table derivation unit 144 derives a quantization table used by the compression processing unit 118 on the basis of the last quantization table held in the quantization table holding unit 146, the subsequent compression rate predicted by the subsequent compression rate prediction unit 134, and the preset target compression rate for continuous image capturing so that the predicted subsequent compression rate will be closer to the target compression rate.

The processes by the subsequent compression rate prediction unit 134, the frequency response derivation unit 136, the gradation derivation unit 140, and the quantization table derivation unit 144 will be specifically explained hereafter.

(Process of Predicting Subsequent Compression Rate)

As mentioned above, the subsequent compression rate prediction unit 134 fetches, from the current compression rate holding unit 132, the current compression rates inclusive of the latest compression rate which correspond to a plurality of past times, and predicts a subsequent compression rate being a compression rate for the image data to be subjected to the compression coding process next time from the plurality of the current compression rates, or a plurality of the held current compression rates and the compression rate for the image data to be subjected to the compression coding process this time. The prediction of the subsequent compression rate is done by using (1) a mean value, (2) difference values, or (3) variation rates of a plurality of current compression rates. Each of processes of deriving a subsequent compression rate will be explained in detail hereafter.

Figure 2:
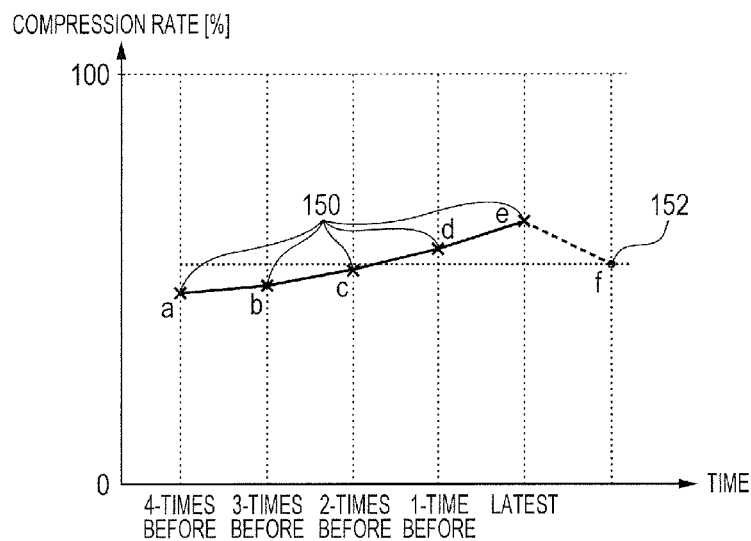
[FIG. 2] It is an explanation view for explaining operation of a subsequent compression rate prediction unit.
Figure 3:
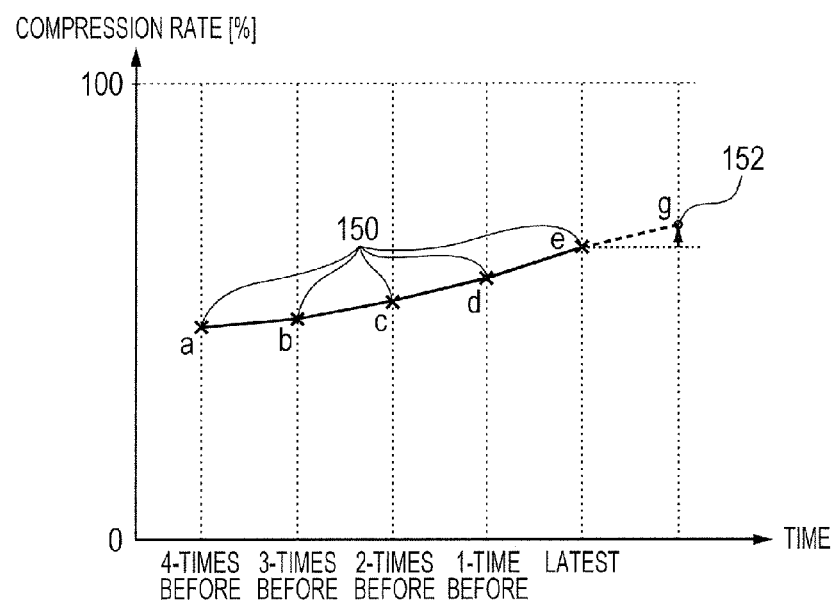
[FIG. 3] It is an explanation view for explaining operation of the subsequent compression rate prediction unit.
Figure 4:
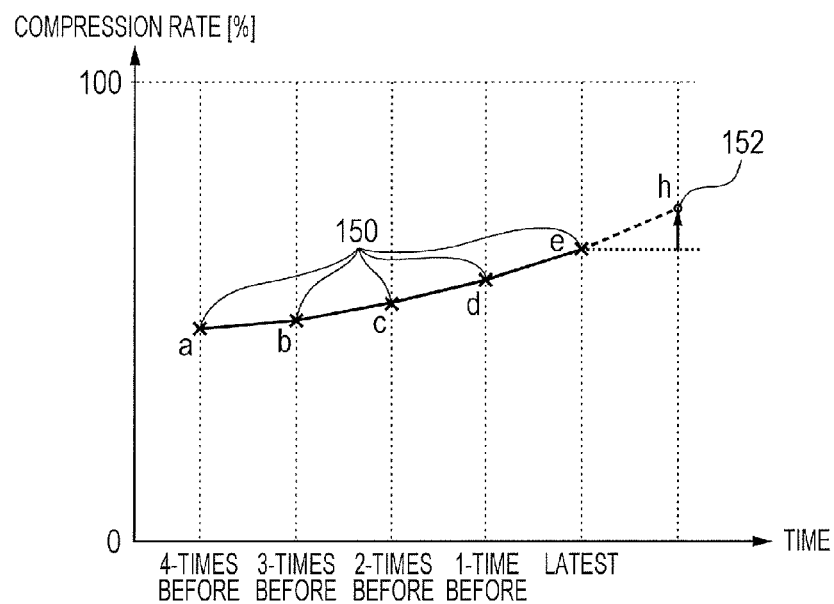
[FIG. 4] It is an explanation view for explaining operation of the subsequent compression rate prediction unit.

FIGS. 2~4 are explanation views for explaining operation of the subsequent compression rate prediction unit 134. Especially, FIG. 2 shows the case where (1) a mean value is used, FIG. 3 shows the case where (2) difference values are used, and FIG. 4 shows the case where (3) variation rates are used. Here, the subsequent compression rate prediction unit 134 predicts a subsequent compression rate 152 on the basis of the 5-times current compression rates 150 being the latest current compression rate and the 4-times past current compression rates. The number of current compression rates 150 used by the subsequent compression rate prediction unit 134 is not limited to 5, and may be equal to or greater than 2.

In the case where a mean value is used as in FIG. 2, the subsequent compression rate prediction unit 134 calculates a mean value f of the 5-times current compression rates (a, b, c, d, and e in FIG. 2) inclusive of the latest one by using the following equation 1.

[Equation 1]

$$f = \frac{a+b+c+d+e}{5} \quad \text{(equation 1)}$$

The mean value f which is calculated in this way will be the subsequent compression rate 152. In the case where the mean value is used in this way, even when a great variation occurs in compression rate in a short time, for example, when irregular images are captured, it is made possible to derive a proper subsequent compression rate 152 without following the variation in an easygoing manner.

In the case where difference values are used as in FIG. 3, as shown in a below equation (2), the subsequent compression rate prediction unit 134 calculates difference values (b-a, c-b, d-c, and e-d) between current compression rates 150 neighboring in the time direction among the 5-times current compression rates 150 (a, b, c, d, and e in FIG. 3) inclusive of the latest one, and adds a mean value of them to the latest compression rate 150 (here e).

[Equation 2]

$$g = e + \frac{(b-a)+(c-b)+(d-c)+(e-d)}{4} = e + \frac{(e-a)}{4} \quad \text{(equation 2)}$$

The value g which is calculated in this way by using the difference values will be the subsequent compression rate 152. In the case where the difference values are used in this way, when the compression rate continues to vary one of the increasing direction and the decreasing direction or the direction of the variation is one-sided, for example, when the amount of movement between images is great, it is made possible to derive a proper subsequent compression rate 152 which follows the variation.

In the case where variation rates are used as in FIG. 4, as shown in a below equation (3), the subsequent compression rate prediction unit 134 calculates variation rates (b/a, c/b, d/c, and e/d) between current compression rates 150 neighboring in the time direction among the 5-times current compression rates 150 (a, b, c, d, and e in FIG. 4) inclusive of the latest one, and multiplies the latest compression rate 150 (e here) by a mean value of them.

[Equation 3]

$$h = e \times \frac{\frac{b}{a} + \frac{c}{b} + \frac{d}{c} + \frac{e}{d}}{4}$$ (equation 3)

The value h which is calculated in this way by using the variation rates will be the subsequent compression rate 152. In the case where the variation rates are used in this way, when the compression rate continues to vary one of the increasing direction and the decreasing direction or the direction of the variation is one-sided, for example, when the amount of movement between images is great, it is made possible to derive a proper subsequent compression rate 152 which follows the variation.

As mentioned above, it is sufficient that the number of the current compression rates 150 used by the subsequent compression rate prediction unit 134 is 2 or more. When the number of current compression rates 150 is less than a predetermined number, for example, at the time of start of continuous image capturing, the subsequent compression rate prediction unit 134 may directly label the latest current compression rate 150 held in the current compression rate holding unit 132 as a subsequent compression rate 152 or may predict a subsequent compression rate 152 with reflecting only current compression rates 150, the number of which is less than the predetermined number.

For example, regarding image capturing for the first piece of image data in continuous image capturing, a current compression rate 150 previous by 1-time is absent, and thus the frequency response processing unit 114, the gradation processing unit 116, and the compression processing unit 118 perform the conversion processes and the compression coding process on the basis of a standard frequency response characteristic, a standard gradation characteristic, and a standard quantization table which are prepared in advance, respectively. The standard frequency response characteristic, the standard gradation characteristic, and the standard quantization table are set on the basis of a target compression rate set by a user through an external operation. The subsequent compression rate prediction unit 134 directly labels the current compression rate 150 of the image data by the conversion processes and the compression coding process as a subsequent compression rate 152. Regarding image capturing for the second piece of image data, although only the 1-time current compression rate 150 is held, the frequency response processing unit 114, the gradation processing unit 116, and the compression processing unit 118 perform the conversion processes and the compression coding process on the basis of a new frequency response characteristic, a new gradation characteristic, and a new quantization table which are derived from the subsequent compression rate 152 based on the 1-time current compression rate 150.

Similarly, until the number of current compression rates 150 reaches the predetermined number, the subsequent compression rate prediction unit 134 predicts a subsequent compression rate by using current compression rates 150, the number of which is less than the predetermined number, held in the current compression rate holding unit 132, and the frequency response processing unit 114, the gradation processing unit 116, and the compression processing unit 118 perform the conversion processes and the compression coding process on the basis of a new frequency response characteristic, a new gradation characteristic, and a new quantization table which are derived from the subsequent compression rate 152. At this time, the data control unit 124 may not store the image data, which occurs until the number of current compression rates 150 reaches the predetermined number, among the generated image data in the image storage unit 126, and may start to store it after the predetermined number is reached.

Here, during the term from the moment of image capturing for the second piece of image data in continuous image capturing to the moment at which the predetermined number is reached, the frequency response processing unit 114, the gradation processing unit 116, and the compression processing unit 118 perform the conversion processes and the compression coding process on the basis of a new frequency response characteristic, a new gradation characteristic, and a new quantization table which use the current compression rates 150 held in the current compression rate holding unit 132. The present embodiment is not limited to this case, and the frequency response processing unit 114, the gradation processing unit 116, and the compression processing unit 118 may perform the conversion processes and the compression coding process on the basis of the standard frequency response characteristic, the standard gradation characteristic, and the standard quantization table prepared in advance until the predetermined number is reached similarly to the case of the first piece of image data.

Temporal positions at which a plurality of current compression rates 150 are taken out are not limited to the latest and one or more of past times, and may be a predetermined number of past times except the latest.

In addition, the subsequent compression rate prediction unit 134 may change 2 or 3 processes selected from a group of (1) the above-mentioned process of averaging current compression rates 150, the number of which is equal to the predetermined number, (2) the above-mentioned process of adding a mean value of difference values between current compression rates 150 neighboring in the time direction of the current compression rates 150 to the latest current compression rate 150, and (3) the above-mentioned process of multiplying the latest current compression rate 150 by a mean value of variation rates between current compression rates 150 neighboring in the time direction of the current compression rates 150 in response to a condition of the variation (the direction or the magnitude of the variation) in current compression rate 150, and thereby predict a subsequent compression rate 152.

For example, (1) the process of averaging current compression rates 150, the number of which is equal to the predetermined number, and (2) the process of adding a mean value of difference values between current compression rates 150 neighboring in the time direction of the current compression rates 150 to the latest current compression rate 150 may be changeably combined. In this case, the subsequent compression rate prediction unit 134 monitors a condition of a variation in current compression rate 150, and predicts a subsequent compression rate 152 through the use of (2) difference values when the compression rate continues to continuously vary in one of the increasing direction and the decreasing direction or the direction of the variation is one-sided, for example, when the amount of movement between images is great, and predicts a subsequent compression rate 152 through the use of (1) a mean value when a great variation in compression rate occurs in a short time, for example, when irregular images are captured. By using an effective method of deriving a subsequent compression rate depending on a condition of a variation in current compression rate 150 in this way, it is made possible that the data volume of image data occurring after the compression coding will be closer to the target value at a higher accuracy.

Subsequently, correction of a compression rate of image data will be explained. The correction of the compression rate of the image data is done by the procedure where the frequency response processing unit 114, the gradation processing unit 116, and the compression processing unit 118 perform the conversion processes and the compression coding process on the basis of a frequency response characteristic, a gradation characteristic, and a quantization table, respectively. Thus, the compression rate for the image data is relatively varied and the current compression rate 150 can be closer to the target compression rate for all the time of continuous image capturing as a result of correcting (a) the frequency response characteristic, (b) the gradation characteristic, and (c) the quantization table.

Here, the target compression rate is a compression rate set by the image capturing person or selected from a plurality of choices (for example, image capturing modes such as a standard mode and a fine mode). The target compression rate may be decided on the basis of the data volume per piece which results from dividing the total data volume which can be stored regarding 1-time continuous image capturing by the number of pieces of the continuous image capturing.

(Process of Deriving Frequency Response Characteristic)

The frequency response derivation unit 136 derives a frequency response characteristic used by the frequency response processing unit 114 on the basis of the last frequency response characteristic, the subsequent compression rate 152, and the target compression rate.

Specifically, first, the frequency response derivation unit 136 compares the subsequent compression rate 152 predicted by the subsequent compression rate prediction unit 134 and the target compression rate, and decides whether the compression effect should be increased or decreased. For example, in the case where the frequency response characteristic is expressed as a frequency response characteristic by an LPF (Low Pass Filter), the frequency response derivation unit 136 increases the cutoff frequency fc (roughly, about 30~40 MHz) of the LPF (expands the pass band width) when deciding that the compression effect should be decreased, and decreases the cutoff frequency fc of the LPF (narrows the pass band width) when deciding that the compression effect should be increased.

Figure 5:
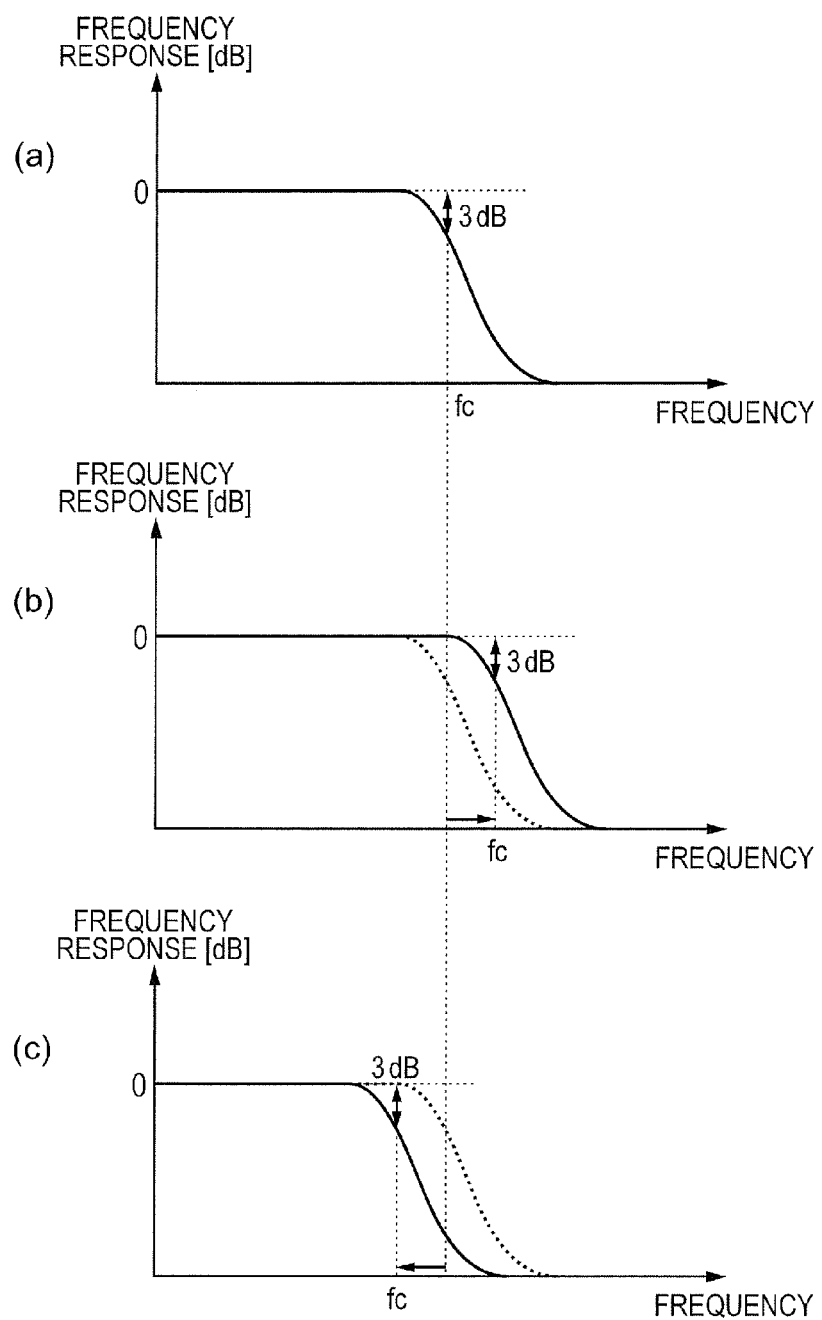
[FIG. 5] It is an explanation view for explaining correction of a compression rate according to a frequency response characteristic.

FIG. 5 is an explanation view for explaining correction of the compression rate according to the frequency response characteristic. In FIG. 5, the abscissa denotes frequency while the ordinate denotes a reply (response) to frequency. In the case where the frequency response characteristic is expressed as a frequency response characteristic by an LPF as mentioned above, the frequency response derivation unit 136 acquires, from the frequency response holding unit 138, the frequency response characteristic which is such as shown in FIG. 5(a) and is derived last (acquires the last LPF cutoff frequency fc), and increases the last LPF cutoff frequency fc by a frequency amount decided depending on the difference value between the subsequent compression rate 152 and the target compression rate as shown in FIG. 5(b) when deciding that the compression effect should be increased. The frequency response derivation unit 136 decreases the last LPF cutoff frequency fc by a frequency amount decided depending on the difference value between the subsequent compression rate 152 and the target compression rate as shown in FIG. 5(c) when deciding that the compression effect should be decreased.

The reason for using the frequency response characteristic in the correction of the compression rate here is as follows. In the case of image data, as high frequency components are more, the data volume of the image data is greater. Therefore, in order to make the compression rate closer to the target compression rate, it is good to adjust the band width of the image data at a stage before the image data is subjected to the compression coding process. Thus, in the present embodiment, when the compression effect by the subsequent compression rate 152 is greater than the compression effect by the target compression rate, it is decided that the compression effect should be decreased and the band width of the frequency response characteristic is expanded. On the other hand, when the compression effect by the subsequent compression rate 152 is less than the compression effect by the target compression rate, it is decided that the compression effect should be increased and the band width of the frequency response characteristic is narrowed.

In the above, an example is taken where the band width of the frequency response characteristic is varied according to the difference value between the subsequent compression rate 152 and the target compression rate, and the frequency response characteristic is derived each time. The present embodiment is not limited to this. For example, the present embodiment may of a structure where a plurality of predetermined frequency response characteristics (for example, a plurality of predetermined cutoff frequencies fc) and a frequency response table, in which the plurality of the frequency response characteristics and difference values between the subsequent compression rate 152 and the target compression rate are made in correspondence, are prepared, and a proper frequency response characteristic is selected on the basis of the difference value between the subsequent compression rate 152 and the target compression rate. According to this structure, the processing load on the frequency response derivation unit 136 can be reduced and the frequency response characteristic can be quickly derived so that a time spent for the compression coding process on the image data can be shortened and the generation intervals for the image data in continuous image capturing can be shortened.

The frequency response derivation unit 136 sends the new frequency response characteristic, which is derived in this way, to the frequency response processing unit 114, and the frequency response processing unit 114 converts the image data on the basis of the new frequency response characteristic. The frequency response derivation unit 136 writes the derived frequency response characteristic over the frequency response characteristic in the frequency response holding unit 138, and thereby prepares for a next-time process.

(Process of Deriving Gradation Characteristic)

The gradation derivation unit 140 derives a gradation characteristic used by the gradation processing unit 116 on the basis of the last gradation characteristic, the subsequent compression rate 152, and the target compression rate.

Specifically, first, the gradation derivation unit 140 compares the subsequent compression rate 152 predicted by the subsequent compression rate prediction unit 134 and the target compression rate, and decides whether the compression effect should be decreased or increased. Second, the gradation derivation unit 140 makes greater, for example, the overall slope of a gradation conversion curved line (here, a straight line) being a gradation characteristic when deciding that the compression effect should be decreased, and makes smaller the overall slope of the gradation conversion curved line when deciding that the compression effect should be increased.

Figure 6:
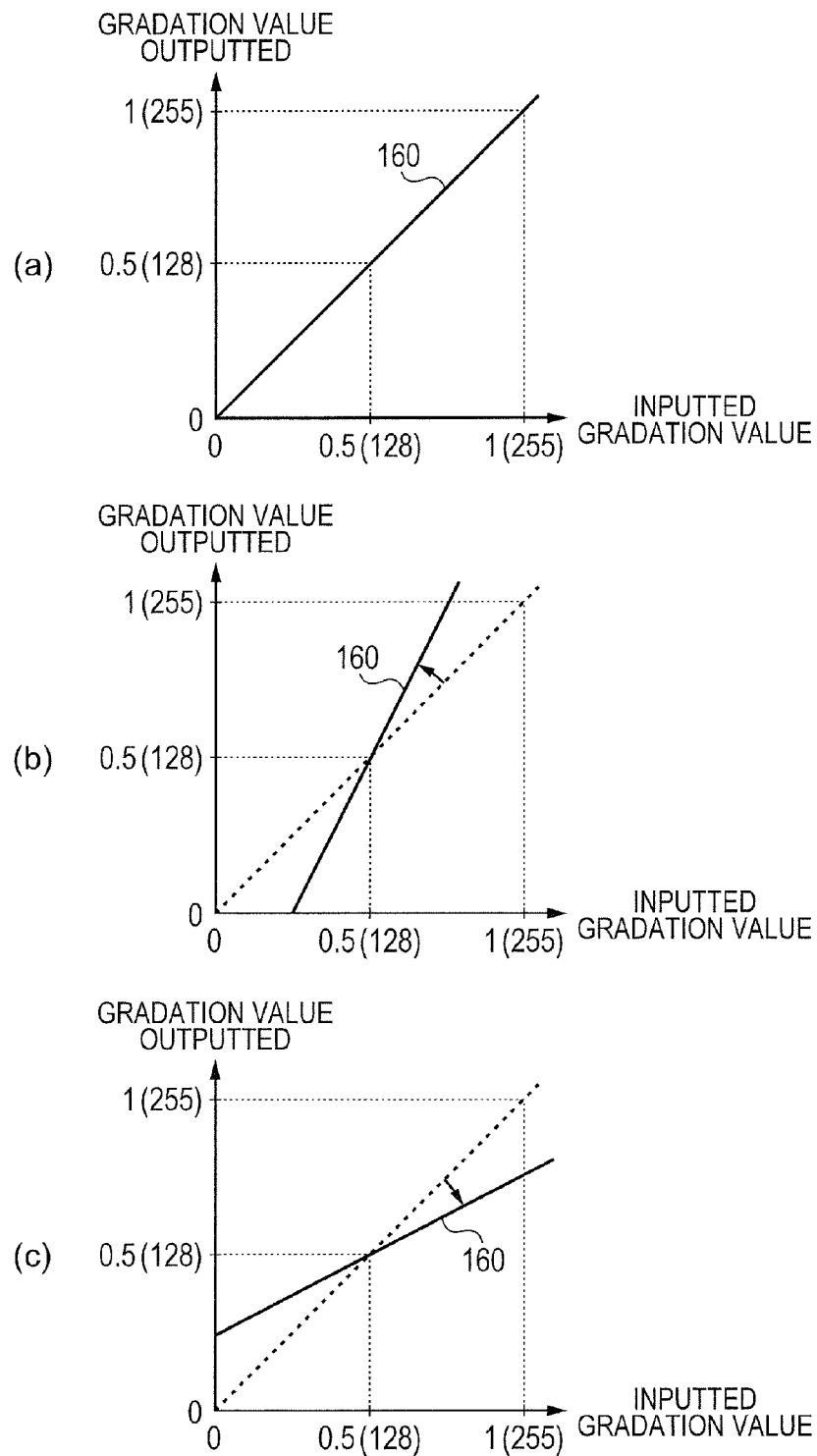
[FIG. 6] It is an explanation view for explaining correction of a compression rate according to a gradation characteristic.

FIG. 6 is an explanation view for explaining correction of a compression rate according to a gradation characteristic. In FIG. 6, the abscissa denotes a gradation value of image data which is inputted to the gradation processing unit 116 while the ordinate denotes a gradation value of image data which is outputted from the gradation processing unit 116. The gradation derivation unit 140 acquires, from the gradation holding unit 142, the gradation characteristic which is such as shown in FIG. 6(*a*) and is derived last (acquires the slope of the last gradation conversion curved line 160 (here, for example, the slope "1")), and increases the slope of the last gradation conversion curved line 160 by a value amount decided depending on the difference value between the subsequent compression rate 152 and the target compression rate as shown in FIG. 6(*b*) when deciding that the compression effect should be decreased. The gradation derivation unit 140 decreases the slope of the last gradation conversion curved line 160 by a value amount decided depending on the difference value between the subsequent compression rate 152 and the target compression rate as shown in FIG. 6(*c*) when deciding that the compression effect should be increased. It should be noted that the offset of the gradation conversion curved line 160 is adjusted to make the outputted gradation value equal to 0.5 when the inputted gradation value is 0.5 as in FIGS. 6(*a*)~(*c*).

The reason for using the gradation characteristic in the correction of the compression rate here is as follows. In the case of image data, as a range which can be taken by the gradation value is greater, the contrast is greater and the data volume of the image data is greater in accordance therewith so that the compression effect needs to be increased accordingly. In order to make the compression rate closer to the target compression rate, it is good to change the contrast of the gradation value of the image data at a stage before the image data is subjected to the compression coding process. Thus, in the present embodiment, when the compression effect by the subsequent compression rate 152 is greater than the compression effect by the target compression rate, it is decided that the compression effect should be decreased and the slope of the gradation conversion curved line 160 being the gradation characteristic is increased to increase the contrast. On the other hand, when the compression effect by the subsequent compression rate 152 is less than the compression effect by the target compression rate, it is decided that the compression effect should be increased and the slope of the gradation conversion curved line 160 is decreased to reduce the contrast.

Here, an explanation is given while an example is taken where the gradation conversion curved line 160 being the gradation characteristic is a straight line (a linear curved line). The gradation conversion curved line 160 is not limited to a straight line, and may be formed by a polygonal line or a quadratic or higher-order gradually-increasing curved line. In this case, the gradation derivation unit 140 may change the gradation conversion curved line 160 so that the slope of a straight line approximate to the gradation conversion curved line 160 will be greater or smaller. While an example is shown where an 8-bit input and an 8-bit output are given as gradation values, another bit value may be taken.

In the above, an example is taken where the slope of the gradation conversion curved line 160 is varied according to the difference value between the subsequent compression rate 152 and the target compression rate, and the gradation characteristic is derived each time. The present embodiment is not limited to this. The present embodiment may of a structure where a plurality of predetermined gradation characteristics (for example, a plurality of predetermined slopes of the gradation conversion curved line 160) and a gradation table, in which the plurality of the slopes of the gradation conversion curved line 160 and difference values between the subsequent compression rates 152 and the target compression rate are made in correspondence, are prepared, and a proper slope of the gradation conversion curved line 160 is selected on the basis of the difference value between the subsequent compression rate 152 and the target compression rate. According to this structure, the processing load on the gradation derivation unit 140 can be reduced and the gradation characteristic can be quickly derived so that a time spent for the compression coding process on the image data can be shortened and the generation intervals for the image data in continuous image capturing can be shortened.

The gradation derivation unit 140 sends the new gradation characteristic (the slope of the gradation conversion curved line 160), which is derived in this way, to the gradation processing unit 116, and the gradation processing unit 116 converts the image data on the basis of the new gradation characteristic. The gradation derivation unit 140 writes the derived gradation characteristic over the gradation characteristic in the gradation holding unit 142, and thereby prepares for a next-time process.

(Process of Deriving Quantization Table)

The quantization table derivation unit 144 derives a quantization table used by the compression processing 118 on the basis of the last quantization table, the subsequent compression rate 152, and the target compression rate. Here, a quantization table means a table designed so that in order to omit relatively high frequency components of image data occurring after discrete cosine transform (DCT: Discrete Cosine Transform) according to JPEG, coefficients dividing the image data are made different from each other and are placed, for example, a table where 8×8 coefficients are placed in the case where an image block is expressed by 8 pixels×8 pixels.

Specifically, first, the quantization table derivation unit 144 compares the subsequent compression rate 152 predicted by the subsequent compression rate prediction unit 134 and the target compression rate, and decides whether the compression effect should be decreased or increased. Second, the quantization table derivation unit 144 makes each of the coefficients in the quantization table equal to a relatively small value (the divisor is small) when deciding that the compression effect should be decreased, and makes each of the coefficients in the quantization table equal to a relatively great value (the divisor is great) when deciding that the compression effect should be increased.

Figure 7:
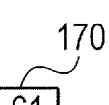
[FIG. 7] It is an explanation view for explaining correction of a compression rate according to a quantization table.
Figure 7:
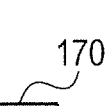
Figure 7:
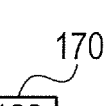

FIG. 7 is an explanation view for explaining correction of a compression rate according to a quantization table 170. In FIG. 7, the quantization table 170 is represented by an arrangement of 8×8 coefficients in harmony with an image block. In the quantization table 170 in FIG. 7, coefficients at left upper places correspond to low frequency components of the image block, and coefficients at right lower places correspond to high frequency components of the image block. The quantization table derivation unit 144 acquires, from the quantization table holding unit 146, the quantization table 170 which is such as shown in FIG. 7(*a*) and is derived last, and decreases each coefficient by a value amount decided depending on the difference value between the subsequent compression rate as 152 and the target compression rate as shown in FIG. 7(*b*) by, for example, multiplying each coefficient by 0.5 when deciding that the compression effect should be decreased. The quantization table derivation unit 144 increases each coefficient by a value amount decided depending on the difference value between the subsequent compression rate 152 and the target compression rate as shown in FIG. 7(*c*) by, for example, multiplying each coefficient by 2 when deciding that the compression effect should be increased.

The reason for using the quantization table 170 in the correction of the compression rate here is as follows. In the case of image data, the compression effect is greater as each coefficient in the quantization table 170 is greater, while the compression effect is smaller as each coefficient in the quantization table 170 is smaller. A specific explanation is as follows. In the case where for example, the data volume of image data occurring before the compression is S, a predicted data volume of image data occurring after the compression is Sa, the data volume of image data which is a target is Sb, and each coefficient in a quantization table 170 which is used 1-time before is $Qorg_{i,j}$ (i and j are integers denoting a row and a column in the quantization table 170, respectively), each coefficient $Q_{i,j}$ (i and j are integers) of a quantization table 170 to be derived can be derived by using an equation 4.

[Equation 4]

$$Q_{i,j} = Qorg_{i,j} \times \frac{\frac{Sa}{S}}{\frac{Sb}{S}} \quad \text{(equation 4)}$$

Here, Sa/S denotes a subsequent compression rate 152, and Sb/S denotes a target compression rate.

For example, in the case where the current compression rate 150 becomes 20% when the quantization table 170 shown in FIG. 7(*a*) is used, the current compression becomes 40% according to the quantization table 170 of FIG. 7(*b*) which results from multiplying the coefficients in the quantization table 170 of FIG. 7(*a*) by 0.5. Similarly, the current compression rate becomes 10% according to the quantization table 170 of FIG. 7(*c*) which results from multiplying the coefficients in the quantization table 170 of FIG. 7(*a*) by 2. This compression coding process is an example, and the compression rate depends on the contents of image data being a base, and the amount of a variation in the compression rate is in an approximately inversely-proportional relation with the ratio of the coefficients of the quantization table 170.

Thus, in the present embodiment, when the compression effect by the subsequent compression rate 152 is greater than the compression effect by the target compression rate, it is decided that the compression effect should be decreased and the coefficients of the quantization table 170 are lowered. On the other hand, when the compression effect by the subsequent compression rate 152 is less than the compression effect by the target compression rate, it is decided that the compression effect should be increased and the coefficients of the quantization table 170 are raised.

In the above, an example is taken where the quantization table 170 is changed depending on the difference value between the subsequent compression rate 152 and the target compression rate, and the quantization table 170 is derived each time. The present embodiment is not limited to this case, and may be of, for example, a structure where a plurality of predetermined quantization tables 170 (for example, those such as in FIGS. 7(*a*), (*b*), and (*c*)), and a quantization correspondence table in which difference values between the subsequent compression rates 152 and the target compression rate and the plurality of the quantization tables 170 are made in correspondence are prepared, and one proper quantization table 170 is selected on the basis of the difference value between the subsequent compression rate 152 and the target compression rate. According to this structure, the processing load on the quantization table derivation unit 144 can be reduced and the quantization table 170 can be quickly derived so that a time spent for the compression coding process on the image data can be shortened and the generation intervals for the image data in continuous image capturing can be shortened.

The quantization table derivation unit 144 sends the new quantization table, which is derived in this way, to the compression processing unit 118, and the compression processing unit 118 subjects the image data to the compression coding process on the basis of the new quantization table 170. In addition, the quantization table derivation unit 144 writes the derived quantization table 170 over the quantization table 170 in the quantization table holding unit 146, and thereby prepares for a next-time process.

Here, an example is taken where the correction of the compression rate is performed by all of the frequency response processing unit 114, the gradation processing unit 116, and the compression processing unit 118. The correction of the compression rate can be performed by only one or two function units selected from the frequency response processing unit 114, the gradation processing unit 116, and the compression processing unit 118. At this time, function units to be adopted may be adopted preferentially in order of the compression processing unit 118, the frequency response processing unit 114, and the gradation processing unit 116 in light of the degree of influence on the compression rate.

For example, the compression processing unit 118 directly performs the compression coding process using the quantization table, and is hence able to easily control the compression rate. The frequency response processing unit 114 can make the number of parts smaller by using an already-existing LPF in the conversion of the frequency response characteristic in the present embodiment. The gradation processing unit 116 can make the number of parts smaller by using an already-existing amplification circuit or an already-existing gamma correction circuit in the conversion of the gradation characteristic. In the case where the correction of the compression rate is performed by one function unit or a combination of two, the correction factor or factors of the other function unit or units are fixed.

Figure 8:
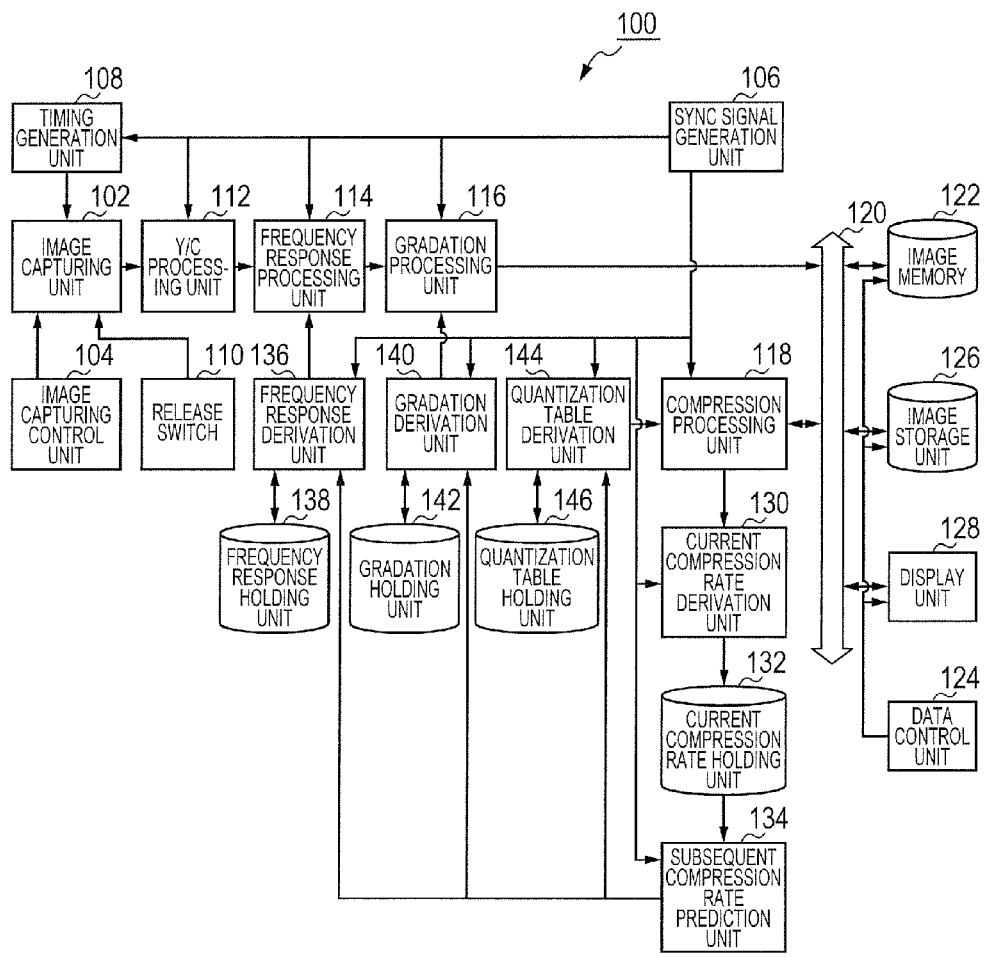
[FIG. 8] It is a function block view showing another example of the image capturing device.

FIG. 8 is a function block view showing another example of the image capturing device 100. While the compression processing unit 118 directly subjects the image data outputted from the gradation processing unit 116 to the compression coding process in the above-mentioned image capturing device 100, the gradation processing unit 116 may make the image data, which has been subjected to the process of converting the gradation characteristic, once held by the image memory 122 via the system internal bus 120. In this case, in the middle of the accumulation of image data by continuous image capturing in the image memory 122 or after the accumulation, the compression processing unit 118 acquires the image data from the image memory 122 and performs the compression coding process on the basis of the quantization table, and sends again it to the image memory 122 via the system internal bus 120. Such a structure where the compression processing unit 118 makes the image data once held in the image memory 122 can be used in a second embodiment mentioned later.

Here, the time efficiency is increased by making the compression coding process and the generation of the image data independent of each other, performing only the generation of the image data at the time of continuous image capturing to shorten the time, and performing the compression coding process while utilizing a time except the time of continuous image capturing. In the present embodiment, the image data can be quickly acquired from the image memory 122 at the time of the compression coding process and the image data in the image memory 122 can be erased early so that the compression coding process can be performed at a high accuracy and a high speed.

In single shooting in the present embodiment, continuous image capturing is carried out regarding the generation of image data, and the data control unit 124 stores a piece of image data, which has been subjected to the compression coding last, among a plurality pieces of image data which have been subjected to the compression coding in the image storage unit 126. This process for single shooting can be used in a second embodiment which will be mentioned later. According to this structure, the process of correcting the compression rate by continuous image capturing can also be used in single shooting, and the data volume of the image data by single shooting can be closer to the desired data volume.

In addition, a program which can be enabled by a computer to function as the image capturing device 100, and a storage medium which stores the program are provided also. Furthermore, the program may be read out from the storage medium before being taken in the computer, or may be transmitted via a communication network before being taken in the computer.

(Image Capturing Method)

Next, an explanation will be given of an image capturing method of subjecting images taken by continuous image capturing (continuous shooting) to a compression coding process and then storing them by use of the above-mentioned image capturing device 100.

Figure 9:
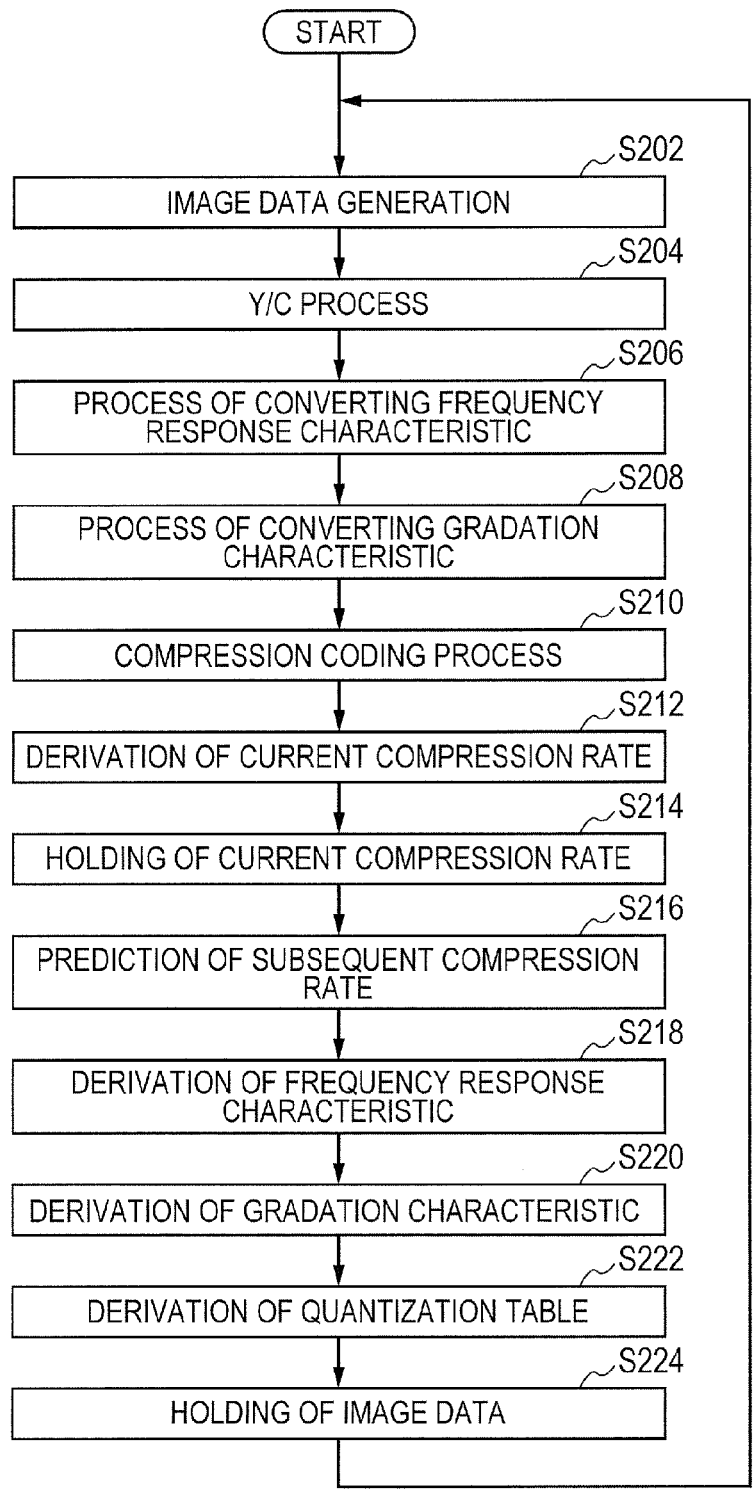
[FIG. 9] It is a flowchart showing a flow of processes in an image capturing method relating to the first embodiment.

FIG. 9 is a flowchart showing a flow of processes in an image capturing method relating to the first embodiment. When an image capturing person carries out continuous image capturing, the image capturing unit 102 of the image capturing device 100 generates a plurality of pieces of image data, which are continuous in the time direction, by the continuous image capturing (S202: an image capturing step) and the Y/C processing unit 112 performs a process of converting and separating the image data into luminance data (Y) and color data (C) (S204). Subsequently, the frequency response processing unit 114 converts the frequency domain characteristic of the image data transmitted via the Y/C processing unit 112 on the basis of a frequency response characteristic derived by the frequency response derivation unit 136 which will be mentioned later (S206: an image processing step 1). The gradation processing unit 116 converts the gradation of the image data which has been subjected to the process of converting the frequency response characteristic on the basis of a gradation characteristic derived by the gradation derivation unit 140 which will be mentioned later (S208: an image processing step 2). The compression processing unit 118 subjects the image data which has been subjected to the process of converting the gradation characteristic to a compression coding process on the basis of a quantization table, and sends it to the image memory 122 via the system internal bus 120 (S210: an image processing step 3).

The current compression rate derivation unit 130 compares the data volume of the image data which occurs before being subjected to the compression coding process by the compression processing unit 118 and the data volume of the image data which occurs after being subjected to the compression coding process, and thereby derives a current compression rate 150 being the latest and actual compression rate in the compression coding process (S212: a current compression rate deriving step), and makes the derived current compression rate 150 held in the current compression rate holding unit 132 (S214: a current compression rate holding step). Then, the subsequent compression rate prediction unit 134 fetches, from the current compression rate holding unit 132, the current compression rates inclusive of the latest compression rate which correspond to a plurality of past times, and predicts a subsequent compression rate being a next-time compression rate from the plural current compression rates (S216: a subsequent compression rate predicting step). The prediction of a subsequent compression rate is done by using (1) a mean value, (2) difference values, or (3) variation rates of the plural current compression rates.

Regarding image capturing for the first piece of image data in continuous image capturing, a current compression rate 150 previous by 1-time is absent, and thus the frequency response processing unit 114, the gradation processing unit 116, and the compression processing unit 118 perform the conversion processes and the compression coding process on the basis of a standard frequency response characteristic, a standard gradation characteristic, and a standard quantization table which are prepared in advance, respectively. The subsequent compression rate prediction unit 134 labels the current compression rate by the conversion processes and the compression coding process as a subsequent compression rate 152. Regarding image capturing for the second piece of image data, the frequency response processing unit 114, the gradation processing unit 116, and the compression processing unit 118 perform the conversion processes and the compression coding process on the basis of a new frequency response characteristic, a new gradation characteristic, and a new quantization table which are derived from the subsequent compression rate 152 based on the 1-time current compression rate 150.

The frequency response derivation unit 136 derives a frequency response characteristic used by the frequency response processing unit 114 on the basis of the last frequency response characteristic held in the frequency response holding unit 138, the subsequent compression rate 152, and a target compression rate (S218: a correction factor deriving step 1). The gradation derivation unit 140 derives a gradation characteristic used by the gradation processing unit 116 on the basis of the last gradation characteristic held in the gradation holding unit 142, the subsequent compression rate 152, and the target compression rate (S220: a correction factor deriving step 2). The quantization table derivation unit 144 derives a quantization table used by the compression processing unit 118 on the basis of the last quantization table held in the quantization table holding unit 146, the subsequent compression rate 152, and the target compression rate (S222: a correction factor deriving step 3). Here, the frequency response derivation unit 136, the gradation derivation unit 140, and the quantization table derivation unit 144 may select a frequency response characteristic, a gradation characteristic, and a quantization table by use of a frequency response table, a gradation table, and a quantization correspondence table, respectively. Finally, the data control unit 124 transfers the image data, which is held in the image memory 122 and has been subjected to the compression coding process, to the image storage unit 126 and makes the image data held (S224: a data control step).

In a prior-art method of repetitively performing a compression coding process, compression coding needs to spend a long time. Furthermore, there was a technique designed so that implementation was done without repeating a compression coding process, and a prediction accuracy was low because a parameter for next-time compression coding was decided by using only an immediately-preceding compression rate for image data. In the image capturing device 100 and the image capturing method according to the present embodiment, since a subsequent compression rate 152 is predicted from a plurality of current compression rates 150 for a plurality of immediately-preceding pieces of image data, it is possible to properly grasp a time-direction variation in images in a short time that is continuous image capturing and it is made possible to make a current compression rate closer to a target compression rate at a higher accuracy. Especially, in the present embodiment, since an image capturing interval is shortened as the speed of compression coding is higher, it is possible to properly predict a compression rate on the basis of more similar image data. Therefore, even in the case where irregular images are captured or a movement amount between images is great (for example, at the time of a focus, zoom, or pan•tilt action), a compression rate does not become an extremely deviate value and it is made possible to perform a compression coding process during the time of continuous image capturing at a high accuracy and a high speed.

(Second Embodiment)

According to the image capturing device 100 explained regarding the first embodiment, a subsequent compression rate is predicted from current compression rates for a plurality of immediately-preceding pieces of image data, and thereby it is made possible to perform a compression coding process at a high accuracy and a high speed. However, in the image capturing device 100, since current compression rates 150 for a plurality of past pieces of image data are referred to for predicting a compression rate for image data being an object to be stored, an image capturing time corresponding in length to the generation of a plurality of pieces of image data needs to be taken until image data with a proper compression rate is stored.

For example, in the case where the image capturing storing speed, that is, the speed at which image data generated by the image capturing unit 102 is stored (the image data is stored in the image storage unit 126, or the image data is left in at least the image memory 122 for storing in the image storage unit 126), is 60 pieces/sec, at least a time of $\frac{1}{60} \times 2 = \frac{1}{30}$ second needs to be taken to obtain two pieces of image data which are the latest image data and the image data 1-time before for predicting a compression rate for the image data to be stored. Therefore, it takes time to start when image capturing is done, and there is a probability that the timing of image capturing will be missed.

Accordingly, an object of a second embodiment is that the image capturing device 100 in the first embodiment is premised and the speed of generation of image data at the time of continuous image capturing is controlled, and thereby a compression coding process is performed at a high accuracy and storing image data is started in a short time.

(Image Capturing Device 300)

Figure 10:
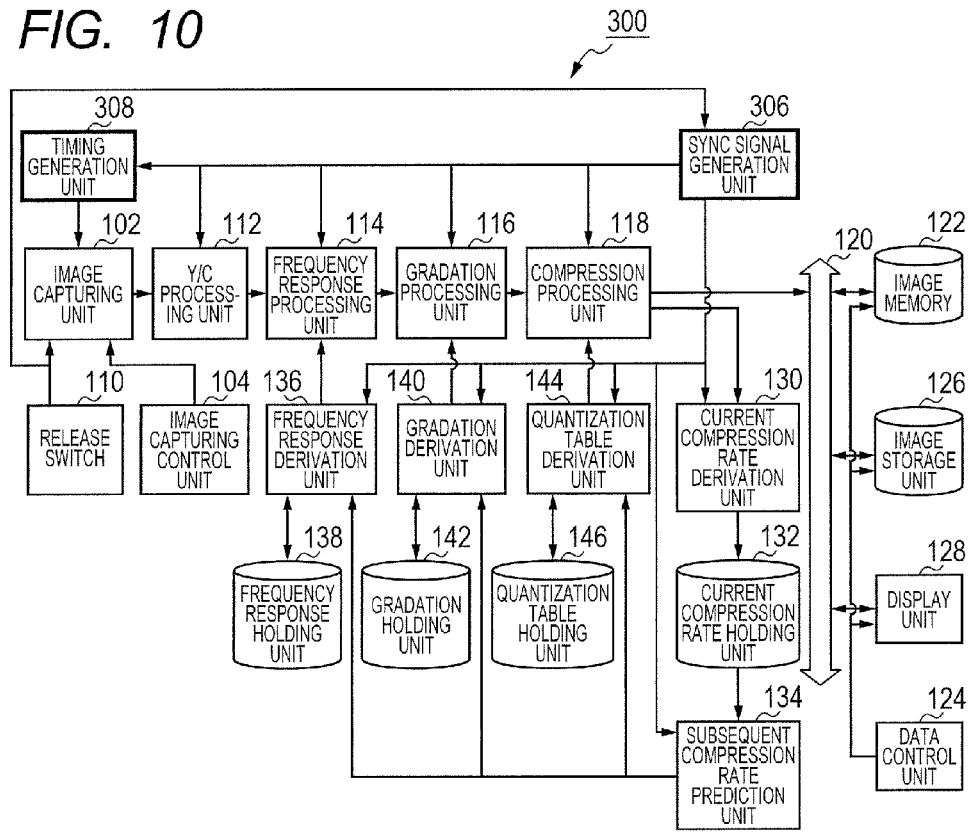
[FIG. 10] It is a function block view showing a diagrammatic structure of an image capturing device relating to a second embodiment.

FIG. 10 is a function block view showing a diagrammatic structure of an image capturing device 300 relating to the second embodiment. The image capturing device 300 is formed by containing an image capturing unit 102, an image capturing control unit 104, a sync signal generation unit 306, a timing generation unit 308, a release switch 110, a Y/C processing unit 112, a frequency response processing unit 114, a gradation processing unit 116, a compression processing unit 118, a system internal bus 120, an image memory 122, a data control unit 124, an image storage unit 126, a display unit 128, a current compression rate derivation unit 130, a current compression rate holding unit 132, a subsequent compression rate prediction unit 134, a frequency response derivation unit 136, a frequency response holding unit 138, a gradation derivation unit 140, a gradation holding unit 142, a quantization table derivation unit 144, and a quantization table holding unit 146. Here, the sync signal generation unit 306 and the timing generation unit 308 function as a generation speed managing unit for managing the speed of generation of image data.

The image capturing unit 102, the image capturing control unit 104, the release switch 110, the Y/C processing unit 112, the frequency response processing unit 114, the gradation processing unit 116, the compression processing unit 118, the system internal bus 120, the image memory 122, the data control unit 124, the image storage unit 126, the display unit 128, the current compression rate derivation unit 130, the current compression rate holding unit 132, the subsequent compression rate prediction unit 134, the frequency response derivation unit 136, the frequency response holding unit 138, the gradation derivation unit 140, the gradation holding unit 142, the quantization table derivation unit 144, and the quantization table holding unit 146 which have already been mentioned as structure elements in the first embodiment are substantially the same in function, and a duplicate explanation thereof will be omitted. Here, the sync signal generation unit 306 and the timing generation unit 308 which are different in structure will be cited, and especially a structure for changing the speed of generation of image data will be explained. While current compression rates necessary for deriving a subsequent compression rate are made plural in the first embodiment, a subsequent compression rate may be derived from only a current compression rate which is the latest in the second embodiment.

The sync signal generation unit 306 generates a horizontal sync signal and a vertical sync signal in correspondence with the horizontal size and the vertical size of generated image data, and sends them to the timing generation unit 308. The timing generation unit 308 generates a control signal for varying a clock timing of the image capturing sensor of the image capturing unit 102 on the basis of the horizontal sync signal and the vertical sync signal generated by the sync signal generation unit 306. The image capturing sensor in the image capturing unit 102 outputs an image signal (image data) in synchronism with the clock timing when receiving a light signal from an external. One object of the present embodiment is to control the speed of generation of image capturing data by the image capturing unit 102, and thus the sync signal generation unit 306 shortens the periods of generation of the horizontal sync signal and the vertical sync signal to increase the speed of generation of image data and lengthens the periods of generation of the horizontal sync signal and the vertical sync signal to decrease the speed of generation of image data. Here, a method of controlling the speed of generation of image data will be mentioned.

Regarding a method of controlling the speed of generation of image data, in the case where the image capturing unit 102 is driven by a prescribed clock, the upper limit of the data volume of image data which can be read from a 1-system output bus of the image capturing sensor per unit time is decided. Thus, in general, the data volume of generated image data is smaller as the speed of generation of the image data is higher, and the data volume of image data is greater as the speed of generation of the image data is lower. This is a technique using the so-called pixel mixture, and a specific method for realization is shown in, for example, Japanese patent application publication number 2006-217355. By providing plural-system output buses and simultaneously obtaining image data from the plural-system output buses at the same timing as disclosed in Japanese patent application publication number Hei 10-191184, image data having a great data volume can be obtained even when the speed of generation of the image data is high.

Therefore, in the above-mentioned technique where the plural-system output buses are provided, it is different from the case where the 1-system output bus is provided, and the data volume of image data does not become small even when the speed of generation of the image data becomes high. Thus, the data volume of the image data does not depend on the speed of generation of the image data, and it is possible to always set the speed of generation of the image data high. In the present embodiment, the technique where the plural-system output buses are provided is used, and it is premised that the data volume of image data is equal even when the speed of generation of the image data is changed.

The sync signal generation unit 306 once makes the speed of generation of the image data by the image capturing unit 102 higher than an image capturing storing speed, the purpose of which is to store the image data, in response to an arbitrary trigger, and then changes it to the image capturing storing speed at a prescribed timing after the arbitrary trigger. Here, the arbitrary trigger is a preparation process for storing the image data. As a preparation process at a stage before the start of image capturing (storing), the image capturing person, for example, half presses the release switch 110 to enable the auto focus of the image capturing unit 102 to function. At this time, the image capturing unit 102 focuses on a subject by moving a focus lens, and makes the speed of generation of the image data higher than the image capturing storing speed. In the image capturing device 300, a subsequent compression rate 152 is quickly predicted by use of the image data generated at a high speed of generation. When the image capturing person fully presses the release switch 110 at a prescribed timing after the half press, continuous image capturing and storing the generated image data are started.

The preparation process at the previous stage is not limited to the above-mentioned operation of starting the auto focus function, and may be an operation of starting detection of a smile of a subject, an operation of starting detection of a variation in an image in a prescribed image area, or an operation of setting an auto timer using a timer at a timing of storing image data in the image memory 122.

When a predetermined number of current compression rates 150 become held so that a subsequent compression rate can be properly predicted, the speed of generation of the image data is returned to the image capturing storing speed and storing in the image memory 122 is started.

Figure 11:
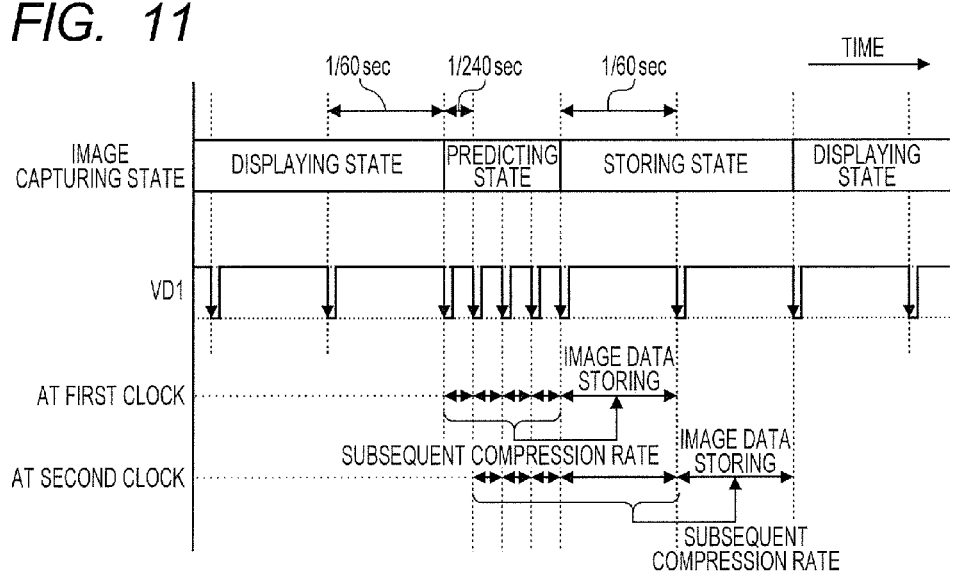
[FIG. 11] It is a timing chart for explaining a variation in the speed of generation of image data.

FIG. 11 is a timing chart for explaining a variation in the speed of generation of image data. FIG. 11 shows transitions among three states being, for example, a storing state whose purpose is to store image data, a predicting state for predicting a subsequent compression rate 152 mainly for the compression coding of image data at a stage before that, and a displaying state for making mainly image data indicated on the display unit 128 for allowing the generated image data to be browsed at a stage further before that as an image capturing state.

The sync signal generation unit 306 sets the speed of generation of the image data to 60 pieces/sec (a period of 1/60 sec) equal to the image capturing storing speed in the displaying state until an arbitrary trigger occurs, and the data control unit 124 makes the generated image data indicated by the display unit 128.

Here, upon the reception of the arbitrary trigger (for example, the operation of starting the auto focus function) being a preparation process for storing the image data through the operation of the release switch 110 by the image capturing person, the image capturing state transitions from the displaying state to the predicting state, and the sync signal generation unit 306 changes the speed of generation of the image data to, for example, 240 pieces/sec (a period of 1/240 sec) higher than the image capturing storing speed by controlling the vertical sync signal VD1 (60 pieces/sec→240 pieces/sec).

When a prescribed time has elapsed from the arbitrary trigger or when a new trigger (for example, a fully pressing operation) is obtained via the operation of the release switch 110 by the image capturing person after a prescribed time has elapsed from the arbitrary trigger, the image capturing state transitions from the predicting state to the storing state and the sync signal generation unit 306 changes the speed of generation of the image data to the image capturing storing speed by controlling the vertical sync signal VD1 (240 pieces/sec→60 pieces/sec). Then, the data control unit 124 starts storing the image data, which is held in the image memory 122, in the image storage unit 126. Here, since current compression rates 150 sufficient for predicting a subsequent compression rate 152 have been acquired in the predicting state, the compression coding of the image data at a proper compression rate is performed in the storing state.

FIG. 11 will be more specifically explained. The image capturing device 300 changes the image capturing state to the predicting state when receiving an arbitrary trigger. The image processing unit (the frequency response processing unit 114, the gradation processing unit 116, and the compression processing unit 118) starts the correction of the compression rate for the image data. The correction factor derivation unit (the frequency response derivation unit 136, the gradation derivation unit 140, and the quantization table derivation unit 144) starts deriving the correction factor necessary for the correction of the compression rate. At the first-time vertical sync signal VD1 in the predicting state, a current compression rate 150 is held in the current compression rate holding unit 132.

For example, in the case where the number of current compression rates 150 for predicting a subsequent compression rate 152 is set to 4, the predicting state continues for a time corresponding to 4 clocks of the vertical sync signal VD1. When 4 current compression rates 150 are held in the current compression rate holding unit 132, the image capturing state transitions from the predicting state to the storing state.

At this time, the subsequent compression rate prediction unit 134 can properly predict a subsequent compression rate 152 from, for example, a mean value of the 4 current compression rates 150 accumulated in the predicting state. Therefore, the correction factor derivation unit (the frequency response derivation unit 136, the gradation derivation unit 140, and the quantization table derivation unit 144) is made able to properly decide a correction factor on the basis of the subsequent compression rate 152 and a target compression rate at and after the first clock of the vertical sync signal VD1 in the storing state, and the image processing unit (the frequency response processing unit 114, the gradation processing unit 116, and the compression processing unit 118) can correct the compression rate for the image data on the basis of the proper correction factor. The image data which has been compression-coded in this way is stored in the image storage unit 126 by, for example, the data control unit 124.

At the second clock of the vertical sync signal VD1 in the storing state, the subsequent compression rate prediction unit 134 predicts a subsequent compression rate from, for example, a means value of the 3 current compression rates 150 immediately-previously obtained in the predicting state and the first-time current compression rate 150 for the image data in the storing state. Thus, the compression rates for the 3 pieces of the image data which are generated at 240 pieces/sec and the 1 piece of the image data which is generated at 60 pieces/sec are referred to.

In the present embodiment, the speed of generation of the image data by the image capturing unit 102 and the speed of storing the image data in the image storage unit 126 by the data control unit 124 are made in harmony by using the sync signal generation unit 306 and the timing generation unit 308, and thereby it is made possible to smoothly perform continuous image capturing.

In the case where the upper limit of the number of pieces of image data which are stored during continuous image capturing is set to 2, the image capturing state automatically transitions from the storing state to the displaying state in response to the fact that the data control unit 124 has stored 2 pieces of the image data in the image storage unit 126. It should be noted that in the example of FIG. 11, the speed of generation of the image data is maintained at the image capturing storing speed (60 pieces/sec). While the upper limit of the number of pieces of image data which are stored during continuous image capturing is set to 2 here, it may be set to 1 or 3 or more. While the number of current compression rates 150 for performing the prediction of a subsequent compression rate 152 is set to 4 in the present embodiment, it is good that the number of current compression rates 150 is 1 or more.

The present embodiment premises that the data volume of image data remains unchanged even when the speed of generation of the image data is changed. In the case where the data volume of image data which occurs before the change and the data volume of image data which occurs after the change are different, since the pixel mixture or another is used, there is a possibility that high frequency components of the image data generated by the image capturing unit 102 will be different from high frequency components of the image data generated before that. Accordingly, the correction factor derivation unit (the frequency response derivation unit 136, the gradation derivation unit 140, and the quantization table derivation unit 144) needs to add reducing high frequency components caused by a change of the speed of generation of the image data as a parameter for deriving the correction factor.

By the above-mentioned change of the speed of generation of the image data, the compression coding operates as follows. Specifically, the accumulation of current compression rates 150 occurring before the start of storing image data in the image memory 122 is performed at a high speed (a speed higher than the image capturing storing speed), and a proper subsequent compression rate is predicted in a short time. Thereafter, the correction of the compression rate is continued at the image capturing storing speed. In the case where the intervals of generation of the image data are short, not only a time necessary for the prediction of a subsequent compression rate 152 is made short but also the accuracy of the prediction of the subsequent compression rate 152 is increased since the continuous image data is similar images.

In addition, the sync signal generation unit 306 may make the speed of generation of the image data by the image capturing unit 102 lower than the image capturing storing speed until an arbitrary trigger occurs and after the image data which is compression-coded last is stored in the image storage unit.

Figure 12:
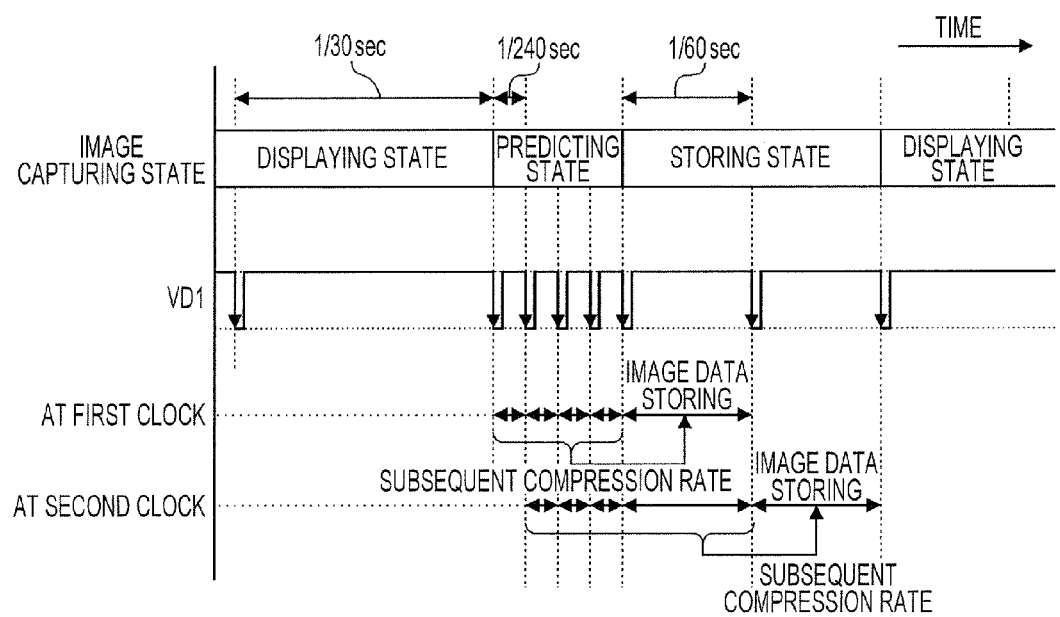
[FIG. 12] It is a timing chart for explaining another example of a variation in the speed of generation of image data.

FIG. 12 is a timing chart for explaining another example of the variation in the speed of generation of the image data. Also in FIG. 12, there are shown transitions among three states being a storing state, a predicting state, and a displaying state as an image capturing state. In FIG. 12, there is shown a vertical sync signal VD1 for performing storing the image data in the image storage unit 126, the generation of the image data, and the compression coding. The vertical sync signal VD1 varies depending on the image capturing state.

The sync signal generation unit 306 sets the speed of generation of the image data to 30 pieces/sec (a period of 1/30 sec) lower than 60 pieces/sec (a period of 1/60 sec) being the image capturing storing speed in the displaying state until an arbitrary trigger occurs, and the data control unit 124 makes the generated image data indicated by the display unit 128. Here, the speed of generation of the image data is lowered in the displaying state which does not affect the storing of the image data, and thereby electric power consumption and heat generation are reduced. In the case where the speed of generation of the image data is excessively lowered, there is a possibility that the function of browsing the image data desired by the image capturing person can not be implemented. Thus, in the present embodiment, the speed of generation of the image data is set to 30 pieces/sec.

Here, upon the reception of the arbitrary trigger (for example, the operation of starting the auto focus function) being a preparation process for storing the image data through the operation of the release switch 110 by the image capturing person, the image capturing state transitions from the displaying state to the predicting state, and the sync signal generation unit 306 changes the speed of generation of the image data to, for example, 240 pieces/sec (a period of 1/240 sec) higher than the image capturing storing speed by controlling the vertical sync signal VD1 (30 pieces/sec→240 pieces/sec).

When a prescribed time has elapsed from the arbitrary trigger or when a new trigger (for example, a fully pressing operation) via the operation of the release switch 110 by the image capturing person is obtained after a prescribed time has elapsed from the arbitrary trigger, the image capturing state transitions from the predicting state to the storing state and the sync signal generation unit 306 changes the speed of generation of the image data to the image capturing storing speed by controlling the vertical sync signal VD1 (240 pieces/sec→60 pieces/sec). The data control unit 124 starts storing the image data, which is held in the image memory 122, in the image storage unit 126 on the basis of the vertical sync signal VD1 making the change to the image capturing storing speed. Here, since current compression rates 150 sufficient for predicting a subsequent compression rate 152 have been acquired in the predicting state, the compression coding of the image data at a proper compression rate is performed in the storing state.

Here, when the image capturing state becomes the storing state, the sync signal generation unit 306 and the timing generation unit 308 control the vertical sync signal VD1 so that the speed of generation of the image data will be the image capturing storing speed. The compression processing unit 118 sends the compression-coded image data to the image memory 122 at a timing accorded with that of storing the image data by the data control unit 124. Therefore, it is possible to efficiently implement the actions from the generation of the image data to the storing thereof, and hence it is possible to realize shortening an overall time for the compression coding.

FIG. 12 will be more specifically explained. The image capturing device 300 indicates the image data on the display unit 128 at 30 pieces/sec in order to reduce electric power consumption and heat generation until receiving an arbitrary trigger. Upon the reception of an arbitrary trigger, the image capturing state of the image capturing device 300 becomes the predicting state so that the image processing unit (the frequency response processing unit 114, the gradation processing unit 116, and the compression processing unit 118) starts the correction of the compression rate for the image data. The correction factor derivation unit (the frequency response derivation unit 136, the gradation derivation unit 140, and the quantization table derivation unit 144) starts deriving the correction factor necessary for the correction of the compression rate. At the first-time vertical sync signal VD1 in the predicting state, a current compression rate 150 is held in the current compression rate holding unit 132.

For example, in the case where the number of current compression rates 150 for predicting a subsequent compression rate 152 is set to 4 as in FIG. 11, the predicting state continues for a time corresponding to 4 clocks of the vertical sync signal VD1. When 4 current compression rates 150 are held in the current compression rate holding unit 132, the image capturing state transitions from the predicting state to the storing state.

At this time, the subsequent compression rate prediction unit 134 can properly predict a subsequent compression rate 152 from, for example, a mean value of the 4 current compression rates 150 accumulated in the predicting state. Therefore, the correction factor derivation unit (the frequency response derivation unit 136, the gradation derivation unit 140, and the quantization table derivation unit 144) is made able to properly decide a correction factor on the basis of the subsequent compression rate 152 and a target compression rate at and after the first clock of the vertical sync signal VD1 in the storing state, and the image processing unit (the frequency response processing unit 114, the gradation processing unit 116, and the compression processing unit 118) can correct the compression rate for the image data on the basis of the proper correction factor. The image data which has been compression-coded in this way is stored in the image storage unit 126 by, for example, the data control unit 124.

At the second clock of the vertical sync signal VD1 in the storing state, the subsequent compression rate prediction unit 134 predicts a subsequent compression rate from, for example, a means value of the 3 current compression rates 150 immediately-previously obtained in the predicting state and the first-time current compression rate 150 for the image data in the storing state. Thus, the compression rates for the 3 pieces of the image data which are generated at 240 pieces/sec and the 1 piece of the image data which is generated at 60 pieces/sec are referred to.

The state transitions in FIG. 12 will be explained from the viewpoint of the image capturing person. The image capturing state which occurs when any operation is not done is the displaying state, and the image capturing person can check the size and position of a subject through the display unit 128 in the case where the image data is generated. The speed of generation of the image data at this time is set to a low value (for example, 30 pieces/sec) in a range where the speed of updating the image data in the display unit 128 is allowed by the image capturing person.

When the image capturing person half presses the release switch 110, the image capturing device 300 implements the auto focus function and focuses on a subject. In addition, the image capturing device 300 changes the image capturing state to the predicting state, and starts the prediction of a subsequent compression rate 152 in the compression coding process in a state where the speed of generation of image data is high (for example, 240 pieces/sec). Subsequently, when the image capturing person fully presses the release switch 110, the image capturing device 300 changes the image capturing state to the storing state and changes the speed of generation of the image data to the image capturing storing speed (60 pieces/sec) for the image data, and stores the image data generated by continuous image capturing. When the image capturing person releases the release switch 110, the image capturing device 300 returns the speed of generation of the image data to a low value (for example, 30 pieces/sec).

The image capturing person can arbitrarily decide image capturing and storing timings by operating, for example, the release switch 110, and can generate desired image data at a desired timing while benefiting from the compression coding process with a high accuracy and a high speed according to the present embodiment.

In addition, a program which can be enabled by a computer to function as the image capturing device 300, and a storage medium which stores the program are provided also. Furthermore, the program may be read out from the storage medium before being taken in the computer, or may be transmitted via a communication network before being taken in the computer.

(Image Capturing Method)

Next, an explanation will be given of an image capturing method of subjecting images taken by continuous image capturing (continuous shooting) to a compression coding process and then storing them by use of the above-mentioned image capturing device 300.

Figure 13:
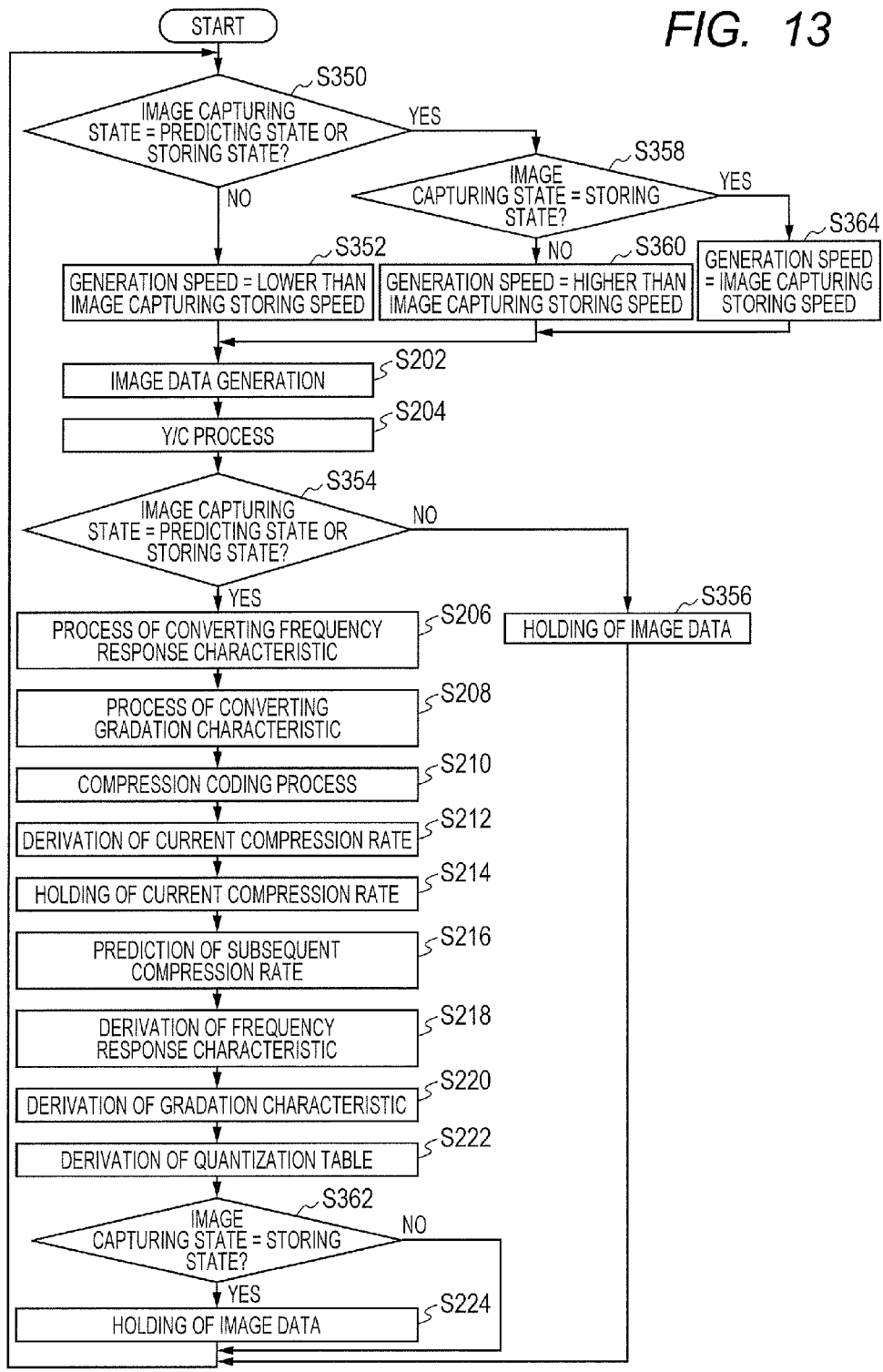
[FIG. 13] It is a flowchart showing a flow of processes in an image capturing method relating to the second embodiment.

FIG. 13 is a flowchart showing a flow of processes in an image capturing method relating to the second embodiment. Here, the processes (S202-S224) which have already been mentioned in the image capturing method in the first embodiment are substantially the same in processes, and a duplicate explanation thereof will be omitted also.

In the present image capturing method, first a decision is made as to whether or not the image capturing state is the predicting state or the storing state (S350). While the image capturing state remains the displaying state being a standard state (NO in S350), the sync signal generation unit 306 sets the speed of generation of the image capturing data lower than the image capturing storing speed (S352).

When the image data generated by the image capturing unit 102 is subjected to the Y/C process by the Y/C processing unit 112 (S204), a decision is made as to whether or not the image capturing state is the predicting state or the storing state (S354). While the image capturing state remains the displaying state (NO in S354), the image capturing device 300 causes the generated image data to be directly held by the image memory 122 without subjecting it to the compression coding process (S356). The image data held in the image memory 122 is indicated on the display unit 128. When the image data holding process S356 is completed, a return to the image capturing state decision step S350 is made.

Upon the reception of a preparation process for storing the image data as an arbitrary trigger, for example, an operation of half pressing the release switch 110 by the image capturing person during the displaying state, the image capturing state transitions from the displaying state to the predicting state. When the image capturing state is decided to be the predicting state in the image capturing state decision step S350 (YES in S350), a decision is made as to whether or not the image capturing state is the storing state (S358). When the image capturing state is not the storing state, that is, when the image capturing state is the predicting state (NO in S358), the sync signal generation unit 306 sets the speed of generation of the image data higher than the image capturing storing speed (S360).

When the image capturing state is decided to be the predicting state in the image capturing state decision step S354 (YES in S354), the compression coding process (S206-S222) is carried out. Then, a decision is made as to whether or not the image capturing state is the storing state (S362). When the image capturing state is not the storing state (NO in S362), a return to the image capturing state decision step S350 is made.

Subsequently, at a prescribed timing based on an arbitrary trigger, for example, upon the reception of an operation of fully pressing the release switch 110 by the image capturing person after a prescribed time has elapsed from an arbitrary trigger, the image capturing state transitions from the predicting state to the storing state. When the image capturing state is decided to be the storing state in the image capturing state decision step S350 (YES in S350) and the image capturing state is decided to be the storing state in the image capturing state decision step S358 (YES in S358), the sync signal generation unit 306 sets the speed of generation of the image data to the image capturing storing speed (S364).

When the image capturing state is decided to be the storing state in the image capturing state decision step S354 (YES in S354), the compression coding process (S206-S222) is carried out as in the predicting state. The, when the image capturing state is decided to be the storing state in the image capturing state decision step S362 (YES in S362), the image data is stored in the image storage unit 126 by the data control unit 124 (S224). When the image data storing process S224 is completed, a return to the image capturing state decision step S350 is made.

According to the image capturing device 300 and the image capturing method which have been explained above, since a subsequent compression rate 152 is predicted from a current compression rate or rates 150 for one or more immediately-preceding pieces of the image data, the image capturing device 300 can properly grasp a time-direction variation in the image data in a short time that is continuous image capturing and is enabled to make a compression rate closer to a target compression rate at a higher accuracy. Furthermore, the prediction of the compression rate for the image data can be performed at a higher accuracy and a higher speed by controlling and changing the speed of generation of the image data, and it is made possible to reduce electric power consumption and heat generation in the displaying state which does not affect the storing of the image data. These advantages can be expected not only in continuous image capturing but also in single shooting.

(Third Embodiment)

The image capturing device 300 which has been explained in the second embodiment makes it possible that the compression coding process can be performed at a high accuracy and a high speed by correcting a deviation of the compression rate through the use of a compression rate or rates for one or more immediately-preceding pieces of the image data and changing the speed of generation of the image data in one image capturing unit. However, there is a probability that a change of the speed of generation of the image data being an object to be stored causes a change in the storing speed, and the storing operation may become unstable. Accordingly, in a third embodiment, there is proposed an image capturing device 400 which can perform a compression coding process at a high accuracy and a high speed during the time of continuous image capturing while maintaining a stable storing operation.

(Image Capturing Device 400)

There is a technique for a stereoscopic image which is designed so that two images having a horizontal parallax are presented on a display unit to make an observer perceive them like the stereoscopic presence of a subject. The two images used by this technique are images captured on the basis of plural different optical axes (viewpoints) by a plurality of image capturing units respectively. A user visually recognizes the two images by the left and right eyes individually, and is thereby enabled to stereoscopically perceive a subject. In an image capturing device in which such a plurality of image capturing units are provided, not only there is a use for a stereoscopic image but also a 2D image can be captured via one image capturing unit (a storing image capturing unit) among the plurality of the image capturing units. An image capturing device in the present embodiment performs continuous image capturing through a storing image capturing unit, and also properly controls a compression rate in a compression coding process in the continuous image capturing through another image capturing unit (a prediction image capturing unit) independently of the storing image capturing unit. Therefore, it is made possible to perform the compression coding process at a high accuracy and a high speed during the time of continuous image capturing while maintaining a stable storing operation. In the following, a diagrammatic structure of the image capturing device will be mentioned, and the speeds of generation of the image data by the storing image capturing unit and the prediction image capturing unit will be explained in detail.

Figure 14:
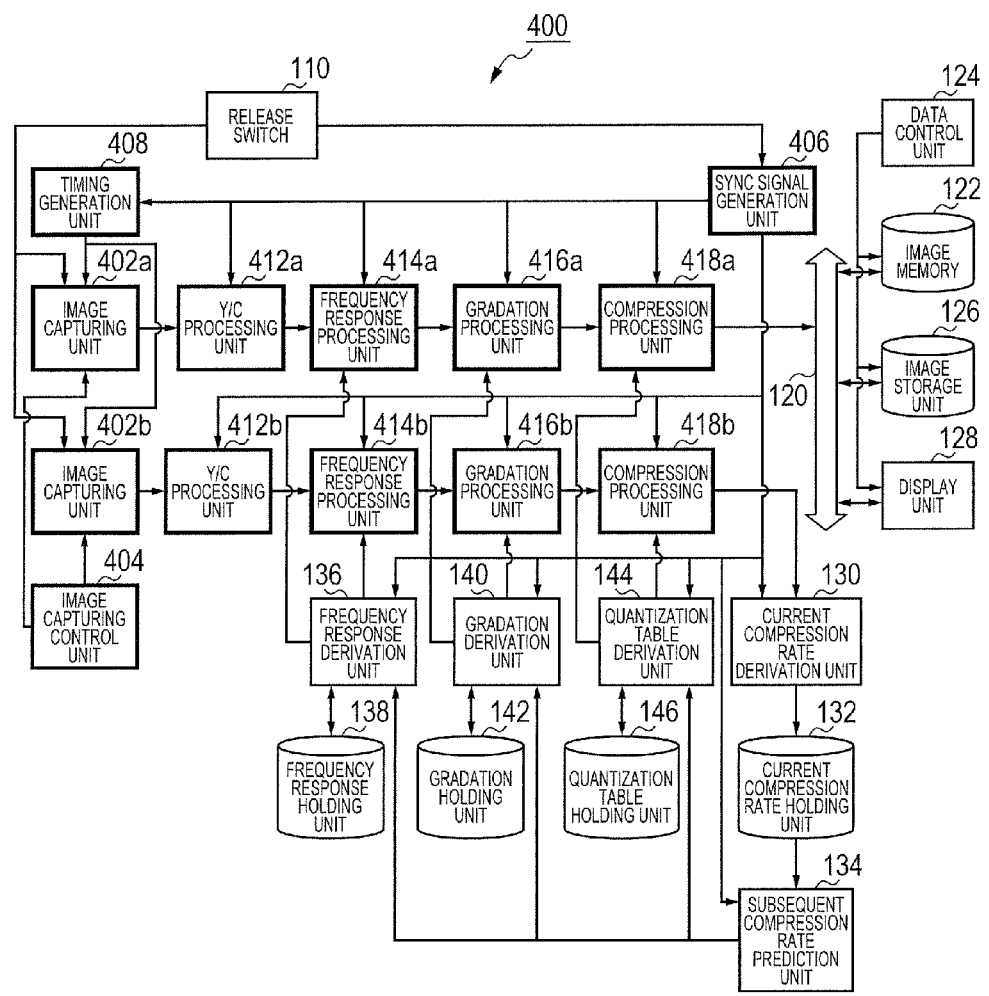
[FIG. 14] It is a function block view showing a diagrammatic structure of an image capturing device relating to a third embodiment.

FIG. 14 is a function block view showing a diagrammatic structure of the image capturing device 400. The image capturing device 400 is formed by containing image capturing units 402 (denoted by 402a and 402b in FIG. 14), an image capturing control unit 404, a sync signal generation unit (SSG: Synchronizing Signal Generator) 406, a timing generation unit (TG: Timing Generator) 408, a release switch 110, Y/C processing units 412 (denoted by 412a and 412b in FIG. 14), frequency response processing units 414 (denoted by 414a and 414b in FIG. 14), gradation processing units 416 (denoted by 416a and 416b in FIG. 14), compression processing units 418 (denoted by 418a and 418b in FIG. 14), a system internal bus 120, an image memory 122, a data control unit 124, an image storage unit 126, a display unit 128, a current compression rate derivation unit 130, a current compression rate holding unit 132, a subsequent compression rate prediction unit 134, a frequency response derivation unit 136, a frequency response holding unit 138, a gradation derivation unit 140, a gradation holding unit 142, a quantization table derivation unit 144, and a quantization table holding unit 146.

The release switch 110, the system internal bus 120, the image memory 122, the data control unit 124, the image storage unit 126, the display unit 128, the current compression rate derivation unit 130, the current compression rate holding unit 132, the subsequent compression rate prediction unit 134, the frequency response derivation unit 136, the frequency response holding unit 138, the gradation derivation unit 140, the gradation holding unit 142, the quantization table derivation unit 144, and the quantization table holding unit 146 which have already been mentioned as structure elements in the first embodiment and the second embodiment are substantially the same in function, and a duplicate explanation thereof will be omitted. Here, the image capturing units 402, the image capturing control unit 404, the Y/C processing units 412, the frequency response processing units 414, the gradation processing units 416, and the compression processing units 418 which are different in structure will be cited, and especially a structure for changing the speed of generation of the image data will be explained.

The image capturing units 402a and 402b are formed by lenses, image capturing sensors subjecting incident light incoming through the lenses to photoelectric conversion and thereby generating image data, drive portions moving optical axes, and others, and generate, for example, a plurality of pieces of image data which are continuous in the time direction by continuous image capturing and sequentially sends the plurality of the generated pieces of image data to the Y/C processing units 412a and 412b respectively. The image capturing units 402a and 402b may be designed so that the two optical axes will be located in a horizontal plane when they are in standard postures, and the two optical axes will intersect while forming an angle of convergence. In the present embodiment, the image capturing unit 402a, which is for a left eye when a stereoscopic image is captured, is used as a storing image capturing unit for generating and storing 2D image data while the image capturing unit 402b, which is for a right eye, is used as a prediction image capturing unit for performing a process of predicting a compression rate in a compression coding process.

The image capturing control unit 404 controls the drive portions of the image capturing units 402a and 402b respectively so that zoom magnifications, aperture stops, and focal points of the two image capturing units 402a and 402b will be equal. The angle of convergence is adjusted by rotating the optical axes of the image capturing units 402a and 402b through equal angles in opposite directions about an axis perpendicular to the plane containing the optical axes respectively. In the present embodiment, the point of convergence is located at the focal point position (the position of a subject) of the image capturing unit 402a being the storing image capturing unit, and thereby the angle of view and the focal point of the image capturing unit 402b can be equalized to the angle of view and the focal point of the image capturing unit 402a and it is made possible to predict a compression rate at a high accuracy from similar image data.

The sync signal generation unit 406 generates a horizontal sync signal and a vertical sync signal in correspondence with the horizontal size and the vertical size of generated image data and in synchronism with an internal clock, and sends them to the timing generation unit 408. The timing generation unit 408 generates a control signal or signals for varying a clock timing or timings of the image capturing sensors of the image capturing units 402 on the basis of the horizontal sync signal and the vertical sync signal generated by the sync signal generation unit 406. The image capturing units 402 generate image data in response to the control signal or signals. One object of the present embodiment is to control the speed of generation of image capturing data by the image capturing unit 402b, and thus the sync signal generation unit 406 shortens the periods of generation of the horizontal sync signal and the vertical sync signal to increase (accelerate) the speed of generation of the image data and lengthens the periods of generation of the horizontal sync signal and the vertical sync signal to decrease (decelerate) the speed of generation of the image data.

The Y/C processing units 412a and 412b perform a process of converting and separating the image data into luminance data (Y) and color data (C). The frequency response processing units 414a and 414b convert the frequency-domain characteristics of the image data past through the Y/C processing units 412a and 412b on the basis of a frequency response characteristic derived by the frequency response derivation unit 136 which will be mentioned later. The gradation processing units 416a and 416b convert the gradations of the image data, which has been subjected to the process of converting the frequency response characteristic, on the basis of a gradation characteristic derived by the gradation derivation unit 140 which will be mentioned later.

The compression processing units 418a and 418b subject the image data, which has been subjected to the process of converting the gradation characteristics, to a compression coding process on the basis of a quantization table according to a JPEG compression system. The compression processing unit 418a sends the image data, which has been subjected to the compression coding process, to the image memory 122 via the system internal bus 120. The compression processing unit 418b sends the image data, which has been subjected to the compression coding process, to the current compression rate derivation unit 130.

(Process of Controlling Generation Speed)

The sync signal generation unit 406 in the image capturing device 400 of the present embodiment adjusts the periods of generation of the horizontal sync signal and the vertical sync signal, and thereby sets the speed of generation of the image data by the image capturing unit 402b higher than the speed of generation of the image data by the image capturing unit 402a.

In the present embodiment, when the speed of generation of the image data (the image capturing storing speed) by the image capturing unit 402a is fixed to 60 pieces/sec (a period of ¹⁄₆₀ sec: 60 fps), the sync signal generation unit 406 controls the speed of generation of the image data by the image capturing unit 402b to be equal to a first generation speed, for example, 240 pieces/sec (a period of ¹⁄₂₄₀: 240 fps). At a prescribed timing after an arbitrary trigger, the process of predicting the compression rate which uses the image capturing unit 402b is started. Here, the arbitrary trigger is a preparation process for storing the image data. As a preparation process at a stage before the start of image capturing (storing), the image capturing person, for example, half presses the release switch 110 to enable the auto focuses of the image capturing units 402a and 402b to function and thereby move the focus lenses and place the focal points on a subject. At this time, in the image capturing device 400, a subsequent compression rate 152 is quickly predicted through the use of the image data generated at a high generation speed (240 pieces/sec) by the image capturing unit 402b. When the image capturing person fully presses the release switch 110 at a prescribed timing after the half press, continuous image capturing and storing generated image data are started in the image capturing unit 402a.

The preparation process at the previous stage is not limited to the operation of starting the above-mentioned auto focus function, and may be an operation of starting detection of a smile of a subject, an operation of starting detection of a variation in an image in a prescribed image area, or an operation of setting an auto timer using a timer at a timing of storing the image data in the image memory 122.

Figure 15:
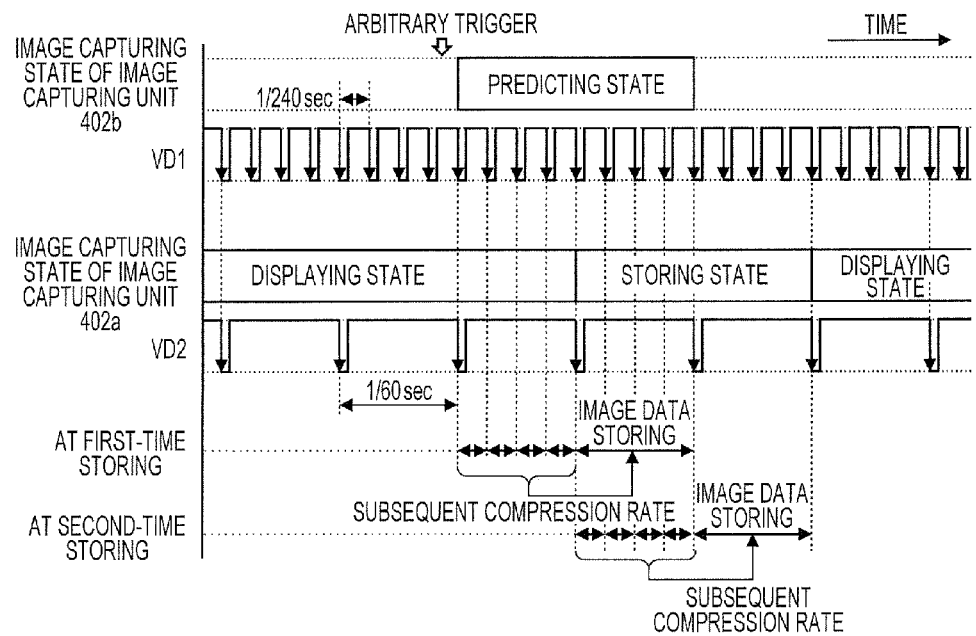
[FIG. 15] It is a timing chart for explaining the speed of generation of image data.

FIG. 15 is a timing chart for explaining the speed of generation of the image data. FIG. 15 shows transitions among three states being, for example, "a storing state" whose purpose is to store the image data generated by the image capturing unit 402a, "a predicting state" for predicting a subsequent compression rate 152 mainly for the compression coding of the image data through the use of the image data generated by the image capturing unit 402b at a stage before that, and "a displaying state" for forcing mainly the image data generated by the image capturing unit 402a to be indicated on the display unit 128 for allowing the image data to be browsed as an image capturing state. Also in the above-mentioned storing state, the indication of the image data for the browse can be continued while storing the image data is done.

In the displaying state until an arbitrary trigger occurs, the data control unit 124 makes the image data, which is generated by the image capturing unit 402a at 60 pieces/sec equal to the image capturing storing speed, indicated by the display unit 128.

Here, at a prescribed timing after the reception of the arbitrary trigger (for example, the operation of starting the auto focus function) being a preparation process for storing the image data through the operation of the release switch 110 by the image capturing person, the image capturing state of the image capturing unit 402b becomes the predicting state and the image capturing unit 402b generates image data at 240 pieces/sec (a period of 1/240 sec) higher than the image capturing storing speed so that the process of predicting a compression rate is performed at the same generation speed. Here, while the process of predicting a compression rate is started in response to the reception of an arbitrary trigger to reduce electric power consumption and heat generation, the process of predicting a compression rate can be always performed.

When a prescribed time has elapsed from the arbitrary trigger or when a new trigger (for example, a fully pressing operation) via the operation of the release switch 110 by the image capturing person is obtained after a prescribed time has elapsed from the arbitrary trigger, the image capturing state of the image capturing unit 402a transitions from the displaying state to the storing state. Then, the data control unit 124 starts storing the image data, which is held in the image memory 122, in the image storage unit 126.

FIG. 15 will be more specifically explained. The image capturing device 400 changes the image capturing state of the image capturing unit 402b to the predicting state when receiving an arbitrary trigger. The image processing unit (the frequency response processing units 414a and 414b, the gradation processing units 416a and 416b, and the compression processing units 418a and 418b) starts the correction of the compression rate for the image data. The correction factor derivation unit (the frequency response derivation units 136, the gradation derivation unit 140, and the quantization table derivation unit 144) starts deriving the correction factor necessary for the correction of the compression rate. At the first clock in the vertical sync signal VD1 in the predicting state of the image capturing state 402b, a current compression rate 150 is held in the current compression rate holding unit 132.

For example, in the case where the number of current compression rates 150 for predicting a subsequent compression rate 152 is set to 4, the predicting state continues for a time corresponding to 4 clocks of the vertical sync signal VD1. When 4 current compression rates 150 are held in the current compression rate holding unit 132, the image capturing state of the image capturing unit 402a transitions from the displaying state to the storing state.

At this time, the subsequent compression rate prediction unit 134 can properly predict a subsequent compression rate 152 from, for example, a mean value of the 4 current compression rates 150 accumulated in the predicting state. Therefore, the correction factor derivation unit (the frequency response derivation unit 136, the gradation derivation unit 140, and the quantization table derivation unit 144) is made able to properly decide a correction factor on the basis of the subsequent compression rate 152 and a target compression rate, and the image processing unit (the frequency response processing unit 414a, the gradation processing unit 416a, and the compression processing unit 418a) can correct the compression rate for the image data on the basis of the proper correction factor at and after the first clock in the vertical sync signal VD2 of the image capturing unit 402a in the storing state. The image data which has been compression-coded by the compression processing unit 418a in this way is stored in the image storage unit 126 by the data control unit 124 (first-time storing).

Subsequently, also at second-time storing, the subsequent compression rate prediction unit 134 predicts a subsequent compression rate from, for example, a mean value of the 4 current compression rates 150 immediately-previously obtained in the predicting state of the image capturing unit 402b, and the image processing unit can correct the compression rate for the image data on the basis of the proper correction factor.

In the case where the upper limit of the number of pieces of image data which are stored during continuous image capturing is set to 2, the image capturing state of the image capturing unit 402a automatically transitions from the storing state to the displaying state in response to the fact that the data control unit 124 has stored 2 pieces of the image data in the image storage unit 126. While the upper limit of the number of pieces of image data which are stored during continuous image capturing is set to 2 here, it may be set to 1 or 3 or more. While the number of current compression rates 150 for performing the prediction of a subsequent compression rate 152 is set to 4 in the present embodiment, it is good that the number of current compression rates 150 is 1 or more.

In this way, in the image capturing device 400, the accumulation of current compression rates 150 occurring before the start of storing the image data generated by the image capturing unit 402a in the image memory 122 is performed at a high speed (a speed higher than the image capturing storing speed) through the use of the image capturing unit 402b, and a proper compression rate is predicted in a short time. In the case where the intervals of generation of the image data are short, not only a time necessary for the prediction of a subsequent compression rate 152 is made short but also the continuous image data becomes similar images so that the accuracy of the prediction of a subsequent compression rate 152 is increased. In the present embodiment, since the speed of generation of the image data by either of the image capturing units 402a and 402b can be fixed, this advantage can be provided and there is a merit that a selection range of the image capturing sensor is expanded even when an image capturing sensor which does not accommodate a change of the frame rate or which is provided with a limitation is used.

MODIFICATION EXAMPLE 1

In addition, the sync signal generation unit 406 can make the image data by the image capturing unit 402b generated at a second generation speed lower than the first generation speed or prevent the image data from being generated during the term from the moment of the start of storing the compression-coded image data in the image storage unit 126 by the data control unit 124 to the moment of the occurrence of an arbitrary trigger.

In the modification example 1, the sync signal generation unit 406 controls the speed of generation of the image data by the image capturing unit 402b to be equal to the second generation speed, for example, 30 pieces/sec (a period of 1/30 sec: 30 fps) while fixing the speed of generation of the image data in the image capturing unit 402a (the image capturing storing speed) to 60 pieces/sec. At a prescribed timing after the arbitrary trigger, the sync signal generation unit 406 changes the speed of generation of the image data by the image capturing unit 402b from 30 pieces/sec to 240 pieces/sec higher than the image capturing storing speed. Specifically, the change of the speed of generation of the image data is implemented by changing the frame rate of the image capturing sensor in the image capturing unit 402b. Here, the arbitrary trigger is a preparation process for storing the image data. When a predetermined number of current compression rates 150 become held so that a subsequent compression rate can be properly predicted, the speed of generation of the image data by the image capturing unit 402b is returned to 30 pieces/sec and storing the image data generated by the image capturing unit 402a in the image memory 122 is started. While the speed of generation of the image data is set to, for example, 30 pieces/sec, it is not limited to this and may be set to an arbitrary generation speed or the image data can be prevented from being generated as mentioned above (0 piece/sec).

Figure 16:
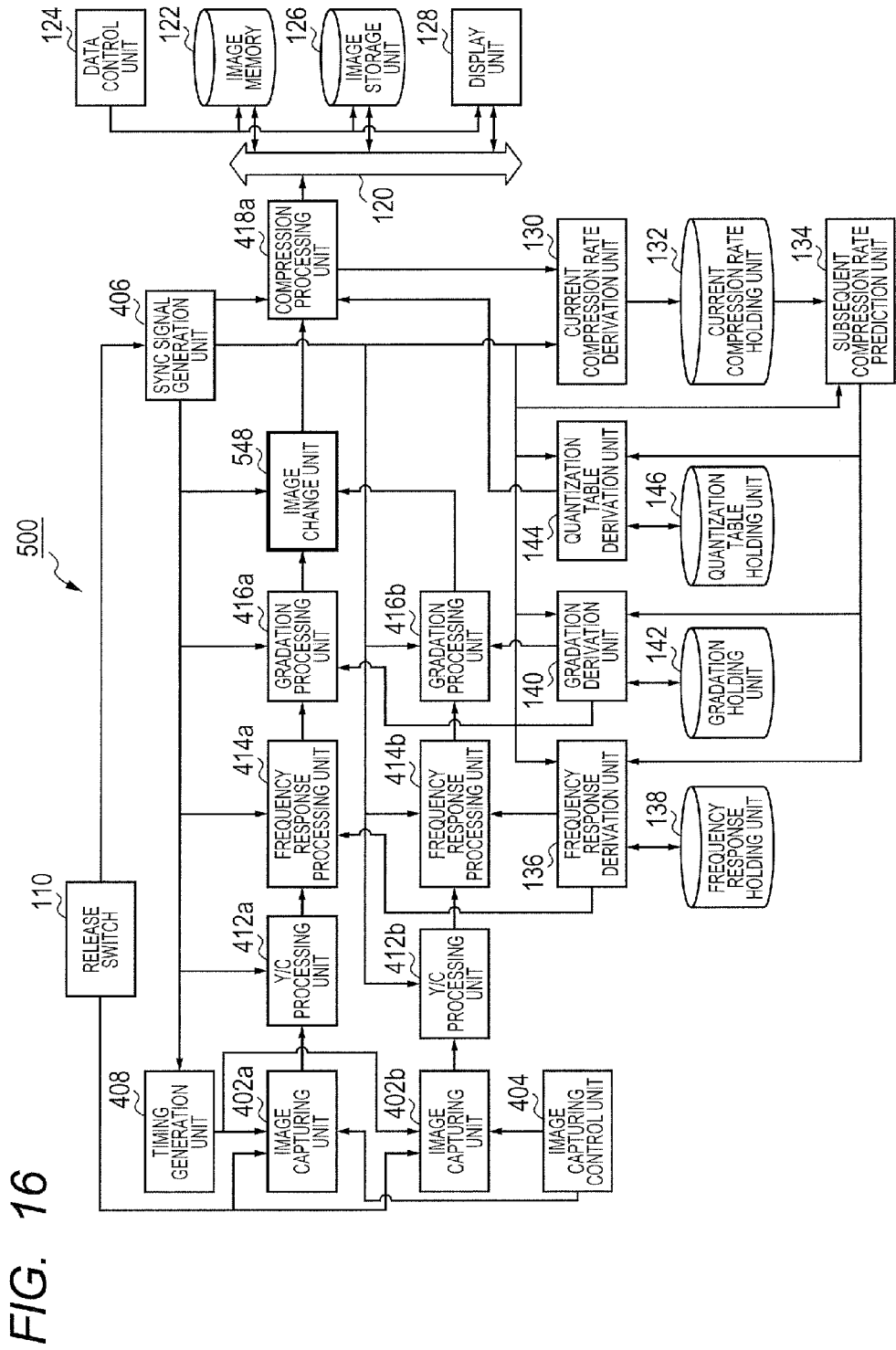
[FIG. 16] It is a function block view showing a diagrammatic structure of an image capturing device in a modification example 1.
Figure 17:
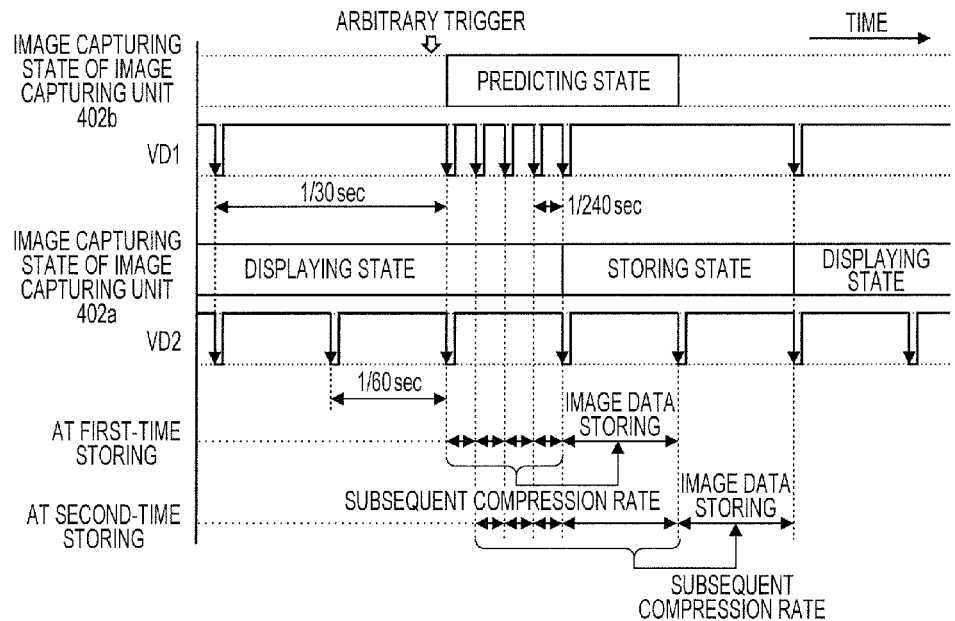
[FIG. 17] It is a timing chart for explaining the speed of generation of image data.

FIG. 16 is a function block view showing a diagrammatic structure of an image capturing device 500 in the modification example 1. FIG. 17 is a timing chart for explaining the speed of generation of the image data. The image capturing device 500 differs from the above-mentioned image capturing device 400 in that an image change unit 548 for changing a source inputting image data into the compression processing unit 418a between the gradation processing unit 416b and the gradation processing unit 416a is added.

In the displaying state until an arbitrary trigger occurs, the data control unit 124 makes the image data, which is generated by the image capturing unit 402a at 60 pieces/sec (a period of 1/60 sec) equal to the image capturing storing speed, indicated by the display unit 128.

Here, at a prescribed timing after the reception of the arbitrary trigger being a preparation process for storing the image data through the operation of the release switch 110 by the image capturing person, the image capturing state of the image capturing unit 402b becomes the predicting state and the sync signal generation unit 406 controls the vertical sync signal VD1 to set the speed of generation of the image data by the image capturing unit 402b to, for example, 240 pieces/sec (a period of 1/240 sec) higher than the image capturing storing speed so that the process of predicting a compression rate is performed at the same generation speed.

When a prescribed time has elapsed from the arbitrary trigger or when a new trigger (for example, a fully pressing operation) via the operation of the release switch 110 by the image capturing person is obtained after a prescribed time has elapsed from the arbitrary trigger, the image capturing state of the image capturing unit 402a transitions from the displaying state to the storing state. At the same time, the sync signal generation unit 406 controls the vertical sync signal VD1 and thereby sets the speed of generation of the image data by the image capturing unit 402b to 30 pieces/sec (240 pieces/sec→30 pieces/sec). Then, the data control unit 124 starts storing the image data, which is held in the image memory 122, in the image storage unit 126.

FIG. 17 will be more specifically explained. The image capturing device 500 changes the image capturing state of the image capturing unit 402b to the predicting state when receiving an arbitrary trigger. The sync signal generation unit 406 changes the speed of generation of the image data by the image capturing unit 402b from 30 pieces/sec to 240 pieces/sec. The image processing unit (the frequency response processing units 414a and 414b, the gradation processing units 416a and 416b, and the compression processing unit 418a) starts the correction of the compression rate for the image data. The correction factor derivation unit (the frequency response derivation units 136, the gradation derivation unit 140, and the quantization table derivation unit 144) starts deriving the correction factor necessary for the correction of the compression rate. At the first clock in the vertical sync signal VD1 in the predicting state of the image capturing state 402b, a current compression rate 150 is held in the current compression rate holding unit 132.

For example, in the case where the number of current compression rates 150 for predicting a subsequent compression rate 152 is set to 4, the predicting state continues for a time corresponding to 4 clocks of the vertical sync signal VD1. When 4 current compression rates 150 are held in the current compression rate holding unit 132, the image capturing state of the image capturing unit 402a transitions from the displaying state to the storing state.

At this time, the subsequent compression rate prediction unit 134 can properly predict a subsequent compression rate 152 from, for example, a mean value of the 4 current compression rates 150 accumulated in the predicting state. Therefore, the correction factor derivation unit (the frequency response derivation unit 136, the gradation derivation unit 140, and the quantization table derivation unit 144) is made able to properly decide a correction factor on the basis of the subsequent compression rate 152 and a target compression rate, and the image processing unit (the frequency response processing unit 414a, the gradation processing unit 416a, and the compression processing unit 418a) can correct the compression rate for the image data on the basis of the proper correction factor at and after the first clock in the vertical sync signal VD2 of the image capturing unit 402a in the storing state. The image data which has been compression-coded by the compression processing unit 418a in this way is stored in the image storage unit 126 by, for example, the data control unit 124 (first-time storing). At a timing corresponding to the first clock in the vertical sync signal VD2 in the storing state, the sync signal generation unit 406 controls the vertical sync signal VD1 and thereby returns the speed of generation of the image data by the image capturing unit 402b to 30 pieces/sec.

At the second clock of the vertical sync signal VD1 in the storing state, the subsequent compression rate prediction unit 134 predicts a subsequent compression rate from, for example, a mean value of three current compression rates 150 immediately-previously obtained in the predicting state of the image capturing unit 402b and another current compression rate 150. However, image data can not be obtained since the sync signal generation unit 406 returns the speed of generation of the image data by the image capturing state 402b to 30 pieces/sec or does not perform the generation of image data. Here, the image change unit 548 changes the source inputting image data into the compression processing unit 418a from the gradation processing unit 416b to the gradation processing unit 416a, and thereby it is possible to refer to the current compression rate 150 for the first-time image data in the storing state. Thus, reference is made to the compression rates for three pieces of the image data generated at 240 pieces/sec and one piece of the image data generated at 60 pieces/sec. The image processing unit can correct the compression rate for the image data on the basis of the proper correction factor (second-time storing).

In this way, in the image capturing device 500, the accumulation of current compression rates 150 occurring before the start of storing the image data generated by the image capturing unit 402a in the image memory 122 is performed at a high speed (a speed higher than the image capturing storing speed) through the use of the image capturing unit 402b, and a proper compression rate is predicted in a short time. In the case where the intervals of generation of the image data are short, not only a time necessary for the prediction of a subsequent compression rate 152 is made short but also the continuous image data becomes similar images so that the accuracy of the prediction of a subsequent compression rate 152 is increased. During the term, where the process of predicting a compression rate is unnecessary, from the moment of the start of storing the compression-coded image data in the image storage unit 126 by the data control unit 124 to the moment of the occurrence of an arbitrary trigger, the speed of generation of the image data by the image capturing unit 402b is made low or the image data is prevented from being generated and thereby it is made possible to reduce electric power consumption and heat generation.

In the modification example 1, the use of the image change unit 548 causes the process of predicting a compression rate through the use of the image data by the image capturing unit 402b to be not performed at and after the first clock in the vertical sync signal VD2 of the image capturing unit 402a in the storing state, and hence it is unnecessary that the image capturing unit 402b and the image capturing unit 402a simultaneously perform the compression processes. Therefore, the compression processing unit 418b in one side can be omitted as shown in FIG. 16, and it is possible to reduce the number of parts and reduce electric power consumption and heat generation.

MODIFICATION EXAMPLE 2

The sync signal generation unit 406 of the image capturing device 400 may make image data generated by the image capturing unit 402b at a second generation speed lower than the first generation speed or may prevent image data from being generated during the term from the moment of the start of storing the compression-coded image data in the image storage unit 126 by the data control unit 124 to the moment of the occurrence of an arbitrary trigger, and additionally make image data generated by the image capturing unit 402b at the first generation speed during a prescribed term until the conduct of storing each time the data control unit 124 stores the compression-coded image data in the image storage unit 126.

In the modification example 2, the sync signal generation unit 406 controls the speed of generation of the image data by the image capturing unit 402b to be equal to a second generation speed, for example, 30 pieces/sec while fixing the speed of generation of the image data by the image capturing unit 402a to 30 pieces/sec, and changes the speed of generation of the image data by the image capturing unit 402b from 30 pieces/sec to 240 pieces/sec higher than the image capturing storing speed at a prescribed timing after an arbitrary trigger. Then, when a predetermined number of current compression rates 150 become held so that a subsequent compression rate can be properly predicted, the speed of generation of the image data by the image capturing unit 402b is returned to 30 pieces/sec and storing in the image memory 122 is started (first-time storing). Furthermore, according to the modification example 2, in the case where the next-time storing of the image data of the image capturing unit 402a is assumed (for example, second-time storing), the image data of the image capturing unit 402b is generated at 240 pieces/sec during a prescribed term (corresponding in length to 4 clocks) until a storing timing comes and the process of predicting a compression rate is performed by using the image data of the image capturing unit 402b.

Figure 18:
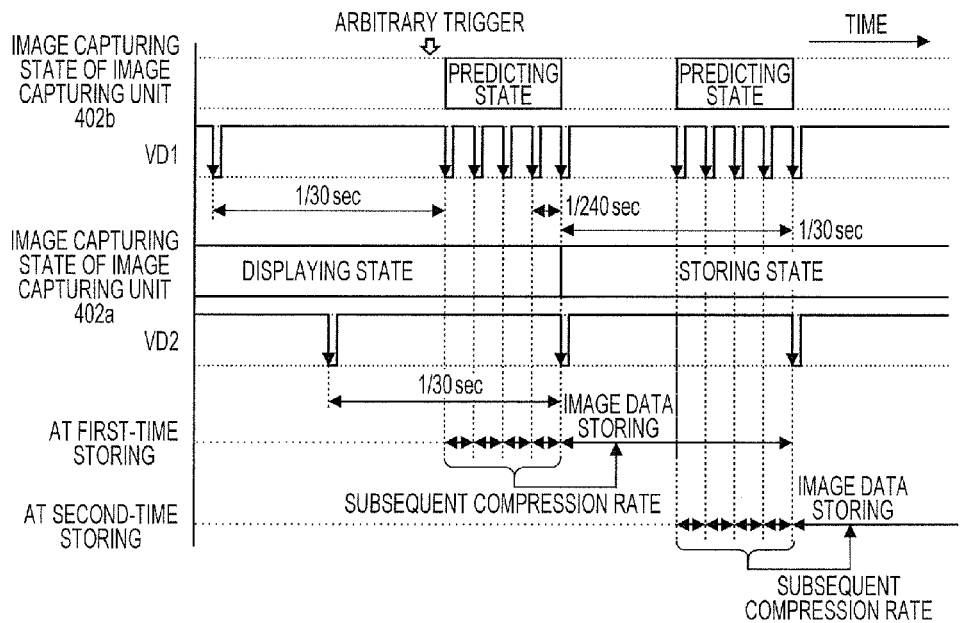
[FIG. 18] It is a timing chart for explaining the speed of generation of image data.

FIG. 18 is a timing chart for explaining the speed of generation of the image data. In the displaying state until an arbitrary trigger occurs, the data control unit 124 makes the image data, which is generated by the image capturing unit 402a at 30 pieces/sec equal to the image capturing storing speed, indicated by the display unit 128.

Here, at a prescribed timing after the reception of the arbitrary trigger being a preparation process for storing the image data through the operation of the release switch 110 by the image capturing person, the image capturing state of the image capturing unit 402b becomes the predicting state and the sync signal generation unit 406 controls the vertical sync signal VD1 to set the speed of generation of the image data by the image capturing unit 402b to, for example, 240 pieces/sec (a period of ¹⁄₂₄₀ sec) higher than the image capturing storing speed so that the process of predicting a compression rate is performed at the same generation speed.

When a prescribed time has elapsed from the arbitrary trigger or when a new trigger via the operation of the release switch 110 by the image capturing person is obtained after a prescribed time has elapsed from the arbitrary trigger, the image capturing state of the image capturing unit 402a transitions from the displaying state to the storing state and the sync signal generation unit 406 controls the vertical sync signal VD1 and thereby sets the speed of generation of the image data by the image capturing unit 402b to 30 pieces/sec (240 pieces/sec→30 pieces/sec). Then, the data control unit 124 starts storing the image data, which is held in the image memory 122, in the image storage unit 126. In the modification example 2, the sequence of actions up to the storing is repeated a number of times which corresponds to the number of pieces of the image data stored in the continuous image capturing.

FIG. 18 will be more specifically explained. The image capturing device 400 changes the image capturing state of the image capturing unit 402b to the predicting state when receiving an arbitrary trigger. The sync signal generation unit 406 changes the speed of generation of the image data by the image capturing unit 402b from 30 pieces/sec to 240 pieces/sec. The image processing unit (the frequency response processing units 414a and 414b, the gradation processing units 416a and 416b, and the compression processing units 418a and 418b) starts the correction of the compression rate for the image data. The correction factor derivation unit (the frequency response derivation units 136, the gradation derivation unit 140, and the quantization table derivation unit 144) starts deriving the correction factor necessary for the correction of the compression rate. At the first clock in the vertical sync signal VD1 of the image capturing state 402b in the predicting state, a current compression rate 150 is held in the current compression rate holding unit 132.

For example, in the case where the number of current compression rates 150 for predicting a subsequent compression rate 152 is set to 4, the predicting state continues for a time corresponding to 4 clocks of the vertical sync signal VD1. When 4 current compression rates 150 are held in the current compression rate holding unit 132, the image capturing state of the image capturing unit 402a transitions from the displaying state to the storing state.

At this time, the subsequent compression rate prediction unit 134 can properly predict a subsequent compression rate 152 from, for example, a mean value of the 4 current compression rates 150 accumulated in the predicting state. Therefore, the correction factor derivation unit (the frequency response derivation unit 136, the gradation derivation unit 140, and the quantization table derivation unit 144) is made able to properly decide a correction factor on the basis of the subsequent compression rate 152 and a target compression rate, and the image processing unit (the frequency response processing unit 414a, the gradation processing unit 416a, and the compression processing unit 418a) can correct the compression rate for the image data on the basis of the proper correction factor at and after the first clock in the vertical sync signal VD2 of the image capturing unit 402a in the storing state. The image data which has been compression-coded by the compression processing unit 418a in this way is stored in the image storage unit 126 by, for example, the data control unit 124 (first-time storing). At a timing corresponding to the first clock in the vertical sync signal VD2 in the storing state, the sync signal generation unit 406 controls the vertical sync signal VD1 and thereby once returns the speed of generation of the image data by the image capturing unit 402b to 30 pieces/sec (it looks 60/sec in FIG. 18 since a clock occurs as the predicting state starts) or suspends the generation of the image data.

Also at the second clock in the vertical sync signal VD1 in the storing state, similarly to the first-time storing, the process of predicting a compression rate through the use of the image capturing unit 402b is carried out from a moment a prescribed-term before the storing timing of second-time storing of the image data by the image capturing unit 402a, and the subsequent compression rate prediction unit 134 can predict a subsequent compression rate from, for example, a mean value of four current compression rates 150 immediately-previously obtained in the predicting state of the image capturing unit 402b. Therefore, the correction factor derivation unit becomes able to properly decide a correction factor on the basis of the subsequent compression rate 152 and a target compression rate, and the image processing unit can correct the compression rate for the image data on the basis of the proper correction factor also at the second clock in the vertical sync signal VD2 of the image capturing unit 402a in the storing state (second-time storing). When the storing state in the vertical sync signal VD2 terminates, the sync signal generation unit 406 once returns the speed of generation of the image data by the image capturing unit 402b to 30 pieces/sec or suspends the generation of the image data by controlling the vertical sync signal VD1.

In this way, in the image capturing device 400, the accumulation of current compression rates 150 occurring before the start of storing the image data generated by the image capturing unit 402a in the image memory 122 is performed at a high speed (a speed higher than the image capturing storing speed) through the use of the image capturing unit 402b, and a proper compression rate is predicted in a short time. In the case where the intervals of generation of the image data are short, not only a time necessary for the prediction of a subsequent compression rate 152 is made short but also the continuous image data becomes similar images so that the accuracy of the prediction of a subsequent compression rate 152 is increased. During the term where the process of predicting a compression rate is unnecessary, the speed of generation of the image data by the image capturing unit 402b is made low or the image data is prevented from being generated and thereby it is made possible to reduce electric power consumption and heat generation. Furthermore, in the modification example 2, it is made possible to perform the process of predicting a compression rate at a high accuracy not only at the time of the start of storing image data generated by continuous image capturing but also during the continuous image capturing, and hence it is made possible to increase the accuracy of the prediction of a compression rate for the whole of the continuous image capturing.

The image capturing person can arbitrarily decide image capturing and storing timings by operating, for example, the release switch 110 in this way, and can generate desired image data at a desired timing while benefiting from the compression coding process with a high accuracy and a high speed according to the present embodiment.

In addition, there are also provided a program functioning as the image capturing device 400 or the image capturing device 500 by a computer, and a storage medium storing the program. Furthermore, the program may be read out from the storage medium before being taken in the computer, or may be transmitted via a communication network before being taken in the computer.

As explained above, in the image capturing device 400 or 500 according to the present embodiment, the plural image capturing units 402a and 402b are simultaneously used and the speeds of generation of the image data are made different and a time for the process of predicting a compression rate is shortened so that similar images can be taken out and it is made possible to increase the accuracy of the prediction of a subsequent compression rate 152. In the image capturing unit 402a which performs storing generated image data, its generation speed is fixed, and thereby a stable storing operation can be maintained and a desired image can be obtained. Furthermore, here, in the case where 2D images are continuously captured by one image capturing unit in a stereoscopic image capturing device having a plurality of image capturing units, effective use of resources can be planned by using another image capturing unit, which is not used, for the process of predicting a compression rate.

In the above, the preferred embodiments of the present invention have been explained with reference to the attached drawings. The present invention is not limited to the embodiments. It is clear that a person skilled in the art can think of various modification examples and revision examples in the mentioned scope of the claims, and it should be understood that they are contained in the technical scope of the present invention.

For example, while the compression processing unit 418a directly subjects the image data outputted from the gradation processing unit 416a to the compression coding process in the third embodiment, the image data which has been subjected to the process of converting the gradation characteristic by the gradation processing unit 416a may be once held by the image memory 122 through the system internal bus 120. In this case, in the middle of the accumulation of image data by continuous image capturing in the image memory 122 or after the accumulation, the compression processing unit 418a acquires the image data from the image memory 122 and performs the compression coding process on the basis of the quantization table, and sends it to the image memory 122 via the system internal bus 120. Here, the time efficiency is increased by making the compression coding process and the generation of the image data independent of each other, performing only the generation of the image data at the time of continuous image capturing to shorten the time, and performing the compression coding process while utilizing a time except the time of continuous image capturing. Furthermore, the image data can be quickly acquired from the image memory 122 at the time of the compression coding process and the image data in the image memory 122 can be erased early so that the compression coding process can be performed at a high accuracy and a high speed.

While continuous image capturing is referred to in the above-mentioned embodiments, the image capturing devices 100, 300, 400, and 500 can be applied to single shooting. For single shooting, continuous image capturing is carried out regarding the generation of image data, and the data control unit 124 stores, among a plurality of pieces of compression-coded image data, only the image data which has been compression-coded last in the image storage unit 126. According to this structure, the process of correcting the compression rate in continuous image capturing can also be used in single shooting, and it is made possible to make the data volume of the image data in single shooting closer to a desired data volume.

It is not always necessary that the processes cited as the image capturing method in the present specification are processed in time series along the order mentioned as the flowchart, and may contain parallel or subroutine-based processes.

Industrial Applicability

The present invention can be used for an image capturing method and an image capturing device designed so that image data generated by continuous image capturing is subjected to a compression coding process by intra-frame predictive coding before being stored.

| Explanation of Characters | |
|---|---|
| 100, 300, 400, 500 | image capturing device |
| 102, 402 (402a, 402b) | image capturing unit |
| 106, 306, 406 | sync signal generation unit |
| 108, 308, 408 | timing signal generation unit |
| 114, 414 (414a, 414b) | frequency response processing unit |
| 116, 416 (416a, 416b) | gradation processing unit |
| 118, 418 (418a, 418b) | compression processing unit |
| 124 | data control unit |
| 126 | image storage unit |
| 130 | current compression rate derivation unit |
| 132 | current compression rate holding unit |
| 134 | subsequent compression rate prediction unit |
| 136 | frequency response derivation unit |
| 138 | frequency response holding unit |
| 140 | gradation derivation unit |
| 142 | gradation holding unit |
| 144 | quantization table derivation unit |
| 146 | quantization table holding unit |
| 150 | current compression rate |
| 152 | subsequent compression rate |
| 160 | gradation conversion curved line |
| 170 | quantization table |
| 548 | image change unit |

The invention claimed is:

1. An image capturing device, comprising:
   an image capturing unit generating a plurality of pieces of image data which are continuous in the time direction by continuous image capturing;
   an image processing unit correcting a compression rate of the image data on the basis of a correction factor for correcting the image data, and performing compression coding by use of an intra-frame predictive coding system;
   a data control unit storing the image data, which has been subjected to the compression coding by the image processing unit, in an image storage unit;
   a current compression rate derivation unit deriving a current compression rate which is an actual compression rate of the image data which has been subjected to the compression coding by the image processing unit;
   a current compression rate holding unit holding a plurality of current compression rates derived by the current compression rate derivation unit and being continuous in the time direction;
   a subsequent compression rate prediction unit predicting a subject compression rate, which is a compression rate of image data to be subjected to the compression coding next time, on the basis of the plurality of current compression rates held by the current compression rate holding unit, or on the basis of the plurality of current compression rates held and the compression rate of the image data to be subjected to the compression coding this time; and
   a correction factor derivation unit deriving the correction factor on the basis of the subsequent compression rate predicted by the subsequent compression rate prediction unit.

2. The image capturing device of claim 1, characterized in that the subsequent compression rate prediction unit averages a predetermined number of the current compression rates and labels the average value as the subsequent compression rate.

3. The image capturing device of claim 1, characterized in that the subsequent compression rate prediction unit averages difference values between a predetermined number of the current compression rates neighboring in the time direction of the current compression rates, and adds the average value to the latest current compression rate to get the subsequent compression rate.

4. The image capturing device of claim 1, characterized in that the subsequent compression rate prediction unit averages variation rates of a predetermined number of the current compression rates neighboring in the time direction of the current compression rates, and multiplies the latest current compression rate by the average value to get the subsequent compression rate.

5. The image capturing device of claim 1, characterized in that the subsequent compression rate prediction unit changes 2 or 3 processes in response to a variation situation of the current compression rates and thereby predicts the subsequent compression rate, the 2 or 3 processes being selected from a group of a process averaging a predetermined number of the current compression rates, a process adding an average value of difference values between the current compression rates neighboring in the time direction of the current compression rates, and a process multiplying the latest current compression rate by an average value of variation rates of the current compression rates neighboring in the time direction of the current compression rates.

6. The image capturing device of claim 1, characterized in that the image processing unit is a frequency response processing unit converting a frequency-domain characteristic of the image data on the basis of a frequency response characteristic being the correction factor, and the correction factor derivation unit is a frequency response derivation unit deriving the frequency response characteristic on the basis of the subsequent compression rate and a target compression rate.

7. The image capturing device mentioned in claim 6, characterized in that there is further provided a frequency response table making a plurality of the predetermined frequency response characteristics, difference values between the subsequent compression rates and the target compression rate, and the plural frequency response characteristics in correspondence, and the frequency response derivation unit selects one frequency response characteristic by using the frequency response table.

8. The image capturing device of claim 1, characterized in that the image processing unit is a gradation processing unit converting a gradation of the image data on the basis of a gradation characteristic being the correction factor, and the correction factor derivation unit is a gradation derivation unit deriving the gradation characteristic on the basis of the subsequent compression rate and a target compression rate.

9. The image capturing device of claim 8, characterized in that there is further provided a gradation table making a plurality of the predetermined gradation characteristics, difference values between the subsequent compression rates and the target compression rate, and the plural gradation characteristics in correspondence, and the gradation derivation unit selects one gradation characteristic by using the gradation table.

10. The image capturing device of claim 1, characterized in that the image processing unit is a compression processing unit subjecting the image data to a compression coding process on the basis of a quantization table being the correction factor, and the correction factor derivation unit is a quantization table derivation unit deriving the quantization table on the basis of the subsequent compression rate and a target compression rate.

11. The image capturing device of claim 10, characterized in that there is further provided a quantization correspondence table making a plurality of predetermined quantization tables, difference values between the subsequent compression rates and the target compression rate, and the plural quantization tables in correspondence, and the quantization table derivation unit selects one quantization table by using the quantization correspondence table.

12. The image capturing device of claim 1, characterized in that there is further provided a generation speed managing unit which makes the speed of generation of the image data by the image capturing unit higher than an image capturing storing speed being a speed at which the image data is stored in response to an arbitrary trigger, and which changes it to the image capturing storing speed at a prescribed timing after the arbitrary trigger.

13. The image capturing device of claim 12, characterized in that the generation speed managing unit makes the speed of generation of the image data by the image capturing unit lower than the image capturing storing speed until the arbitrary trigger occurs and after the image data which is compression-coded last is stored in the image storage unit.

14. The image capturing device of claim 12, characterized in that the arbitrary trigger is a preparation process for storing the image data.

15. The image capturing device of claim 1, characterized in that:
the image capturing unit comprises a plurality of image capturing units, and each generates a plurality of pieces of image data which are continuous in the time direction by continuous image capturing;
the image processing unit comprises a plurality of image processing units, and corrects compression rates of a plurality of pieces of the image data generated by the plurality of image capturing units and performs compression coding by using an intra-frame predictive coding system;
the current compression rate derivation unit derives a current compression rate which is an actual compression rate of the image data which has been subjected to the compression coding by one image processing unit among the plurality of image processing units;
the correction factor derivation unit derives the correction factor on the basis of the subsequent compression rate predicted by the subsequent compression rate prediction unit, and updates the plurality of image processing units;
the data control unit stores the image data, which has been subjected to the compression coding by an image processing unit different from said one image processing unit, in the image storage unit; and
the image data by an image capturing unit relating to said one image processing unit is generated at a first generation speed higher than the speed of generation of the image data by the image processing unit different from said one image processing unit.

16. The image capturing device of claim 15, characterized in that the current compression rate derivation unit, the current compression rate holding unit, the subsequent compression rate prediction unit, and the correction factor derivation unit start processes in response to an arbitrary trigger.

17. The image capturing device of claim 16, characterized in that there is further provided a generation speed managing unit which causes the image data by the image capturing unit relating to said one image processing unit to be generated at a second generation speed lower than the first generation speed or which prevents the image data from being generated during a term from the moment at which the data control unit starts storing the compression-coded image data in the image storage unit to the moment of the occurrence of the arbitrary trigger.

18. The image capturing device of claim 17, characterized in that each time the data control unit stores the compression-coded image data in the image storage unit, the generation speed managing unit causes the image data by the image capturing unit relating to said one image processing unit to be generated at the first generation speed during a prescribed term until the storing is done.

19. The image capturing device of claim 16, characterized in that the arbitrary trigger is a preparation process for storing the image data.

20. The image capturing device of claim 1, characterized in that the data control unit stores, among a plurality of pieces of the compression-coded image data, only one piece of the image data which has been compression-coded last in the image storage unit.

21. An image capturing method, comprising the steps of:
an image capturing step generating a plurality of pieces of image data which are continuous in the time direction by continuous image capturing;
an image processing step correcting a compression rate of the image data generated in the image capturing step on the basis of a correction factor for correcting the image data, and performing compression coding by use of an intra-frame predictive coding system;
a data control step storing the image data, which has been subjected to the compression coding by the image processing step, in an image storage unit;
a current compression rate derivation step deriving a current compression rate which is an actual compression rate of the image data which has been subjected to the compression coding by the image processing step;
a current compression rate holding step holding a plurality of current compression rates derived by the current compression rate derivation step and being continuous in the time direction;
a subsequent compression rate prediction step predicting a subject compression rate, which is a compression rate of image data to be subjected to the compression coding next time, on the basis of the plurality of current compression rates held by the current compression rate holding step, or on the basis of the plurality of current compression rates held and the compression rate of the image data to be subjected to the compression coding this time; and a correction factor derivation step deriving the correction factor on the basis of the subsequent compression rate predicted by the subsequent compression rate prediction step.

\* \* \* \* \*